United States Patent [19]

Osakabe et al.

[11] Patent Number: 5,448,562

[45] Date of Patent: Sep. 5, 1995

[54] BI-DIRECTIONAL BUS SYSTEM AND TRANSMITTING, RECEIVING, AND COMMUNICATION METHODS FOR SAME

[75] Inventors: Yoshio Osakabe, Kanagawa; Shigeo Tanaka, Tokyo; Akira Katsuyama; Hiroshi Yamazaki, both of Kanagawa; Yasuo Kusagaya, Tokyo; Noriko Kotabe, Chiba; Kouichi Sugiyama; Makoto Sato, both of Kanagawa, all of Japan

[73] Assignee: Sony Corporation, Japan

[21] Appl. No.: 169,452

[22] Filed: Dec. 17, 1993

[30] Foreign Application Priority Data

Dec. 21, 1992 [JP] Japan .................... 4-340406
Oct. 29, 1993 [JP] Japan .................... 5-272844

[51] Int. Cl.⁶ .................... H04L 12/28; H04L 12/40
[52] U.S. Cl. .................... 370/85.1; 370/94.1; 370/99; 370/110.1
[58] Field of Search .................... 370/60, 85.1, 85.2, 370/85.3, 94.1, 110.1, 99; 340/825.07, 825.52

[56] References Cited

U.S. PATENT DOCUMENTS 5,293,379  3/1994  Carr .................... 370/94.1
5,325,361  6/1994  Lederer et al. .................... 370/94.1

OTHER PUBLICATIONS

Elektronik, vol. 39, No. 10, May 11, 1990, Munchen De, pp. 140–143, Jurgen Sorgenfrei et al., 'Schnittstellen-IC fur den seriellen kfz-Bus', p. 142, left column, line 26–34; Fig. 2.

IEEE Lts. The Magazine Of Lightwave Communication Systems, vol. 2 No. 1, Feb. 1991, New York US pp. 36–45, Roger W. Uhlhorn 'The Fiber Optic High-Speed Data Bus for a New Generation of Military Aircraft', p. 40, right column, line 44–p. 41, left column, line 10; figure 4.

IEEE Instruction and Measurement Technology Conference, Apr. 1988, New York US pp. 20–25, Richard A. Schuh 'An Overview of the 1553 Bus with Testing and Simulation Considerations' p. 22, left column, line 5, p. 23, right column, line 18–p. 24, left column, line 22, figures 4,5.

Primary Examiner—Melvin Marcelo
Attorney, Agent, or Firm—Pasquale Musacchio; Jerry A. Miller

[57] ABSTRACT

There is a communication system using a bi-directional bus, which includes a plurality of devices (e.g., TV image receiver or video tape recorder, etc.) connected to each other. Each device comprises a transmit signal formation unit adapted to form a transmit signal having a frame structure consisting of an address field for specifying addresses of devices between which communication is carried out, a control field for specifying a data communication command indicating communication of data or a control command communication command indicating communication of control command, whereby, in transmitting data, the device specifies the content of the control field of the leading frame as the data communication command to form the transmit signal; a bus output unit for outputting the transmit signal formed by the transmit signal formation unit to the bi-directional bus; a bus input unit adapted to receive the bi-directional bus; and a control unit for detecting on the basis of the content of the control field of the leading frame of the transmit signal received by the bus input unit whether current communication is communication of data or communication of control command, whereby when communication of data is detected, the control unit recognizes that the content of the data field of this frame is specified as data to carry out a control to receive data.

24 Claims, 15 Drawing Sheets

| Bit number | Meaning |
|---|---|
| 7 | Always 0 |
| 6 | Reserved for future standardization, "1" |
| 5, 4 | Source service code    00 ; CT <br> 01 ; AV/C <br> 10 ; HK <br> 11 ; reserved |
| 3, 2 | Destination service code    00 ; CT <br> 01 ; AV/C <br> 10 ; HK <br> 11 ; reserved |
| 1 | 1/0 without/with SSDA |
| 0 | 1/0 without/with DSDA |

FIG.3
(PRIOR ART)

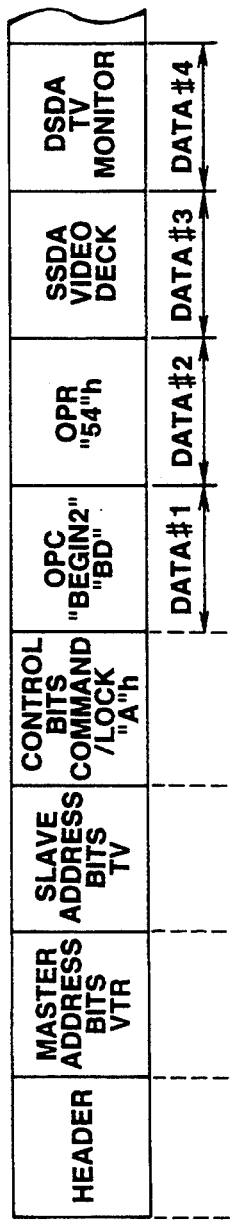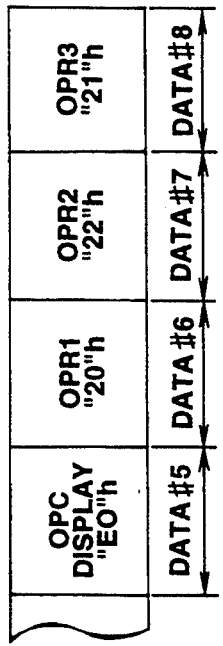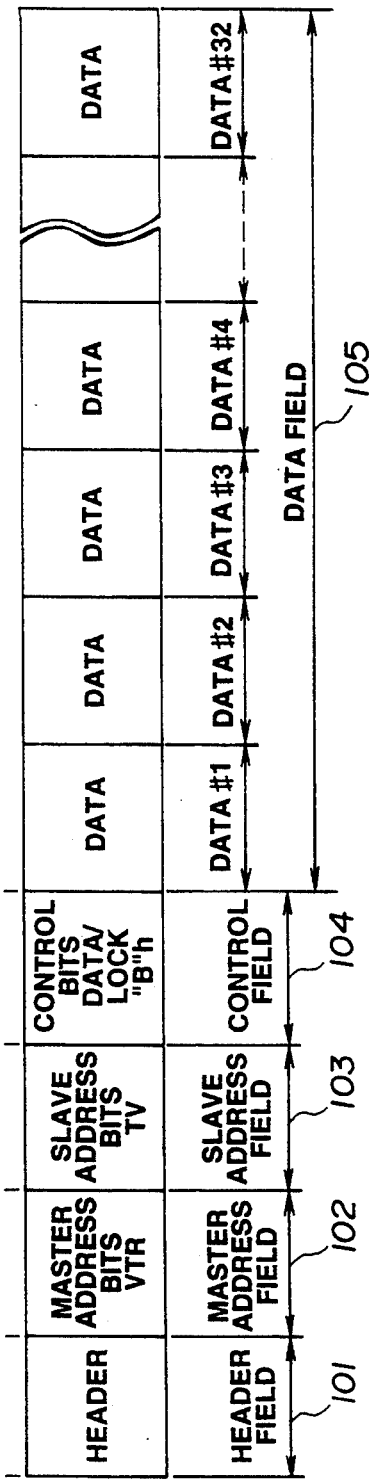
FIG.4A (PRIOR ART)
FIG.4B (PRIOR ART)

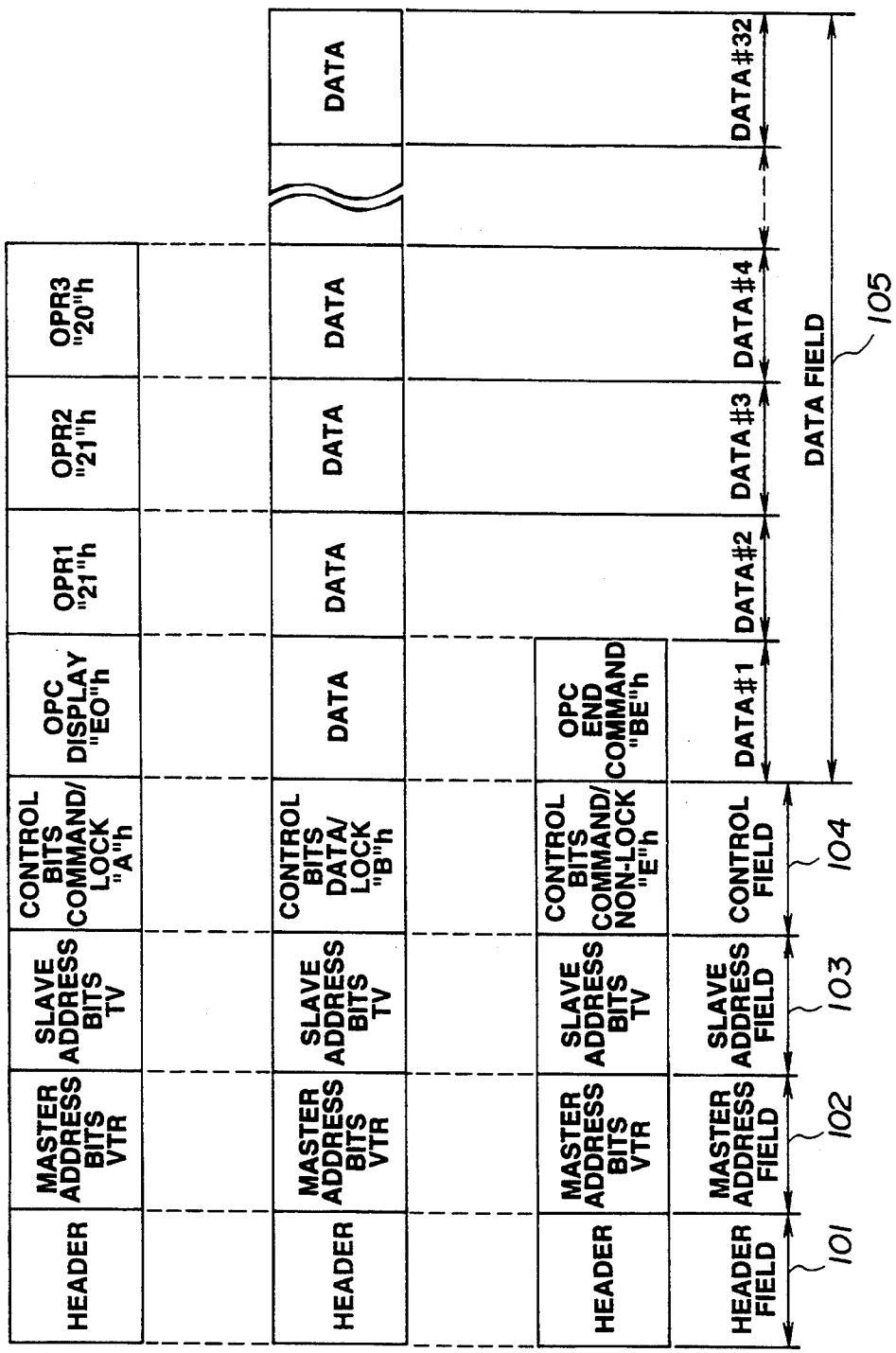

| MSB | | | | | | | LSB |
|---|---|---|---|---|---|---|---|
| b7 | b6 | b5 | b4 | b3 | b2 | b1 | b0 |
| 0 | * | * | * | * | * | 00 : DISABLE<br>01 : COMMUNICATION FROM SUB-DEVICE TO DEVICE<br>10 : COMMUNICATION FROM DEVICE TO SUB-DEVICE<br>11 : COMMUNICATION FROM DEVICE TO DEVICE | |

FIG.12

BI-DIRECTIONAL BUS SYSTEM AND TRANSMITTING, RECEIVING, AND COMMUNICATION METHODS FOR SAME

BACKGROUND OF THE INVENTION

1. Field of the Invention

This invention relates to a transmitting method, a receiving method, a communication method, and a bi-directional bus system, which are used in a system in which devices, e.g., a televisionimage receiver or a video tape recorder, etc. are connected to each other by using a bi-directional bus to control, from otherdevices, sub-devices, e.g., a monitor image receiver, a TV tuner, or a video deck, etc. included in the devices, or to display the operating states, etc. of other devices on the television image receiver.

2. Description of the Related Art

In recent years, there have been popularly used systems in which a plurality of audio equipments or visual equipments (hereinafter referred to as AV equipments) are connected by means of video signal lines or audio signal lines (hereinafter referred to as AV signal lines).

In such AV systems, equipments are connected by means of a system control bus (hereinafter simply referred to as a bi-directional bus) in addition to the above-described AV signal lines to control respective equipments. In a practical sense, Audio, Video and audiovisual systems Domestic Digital Bus (hereinafter referred to as D2B) standardized by the so-called publication 1030 of IEC, a Home Bus System (hereinafter referred to as HBS) standardized by the ET-2101 of EIAJ, and the like are known. Through the bi-directional bus, other devices are controlled from equipments (devices), e.g., a television image receiver, a video tape recorder, and a video deck player (hereinafter respectively referred to as TV, VTR, VDP), etc., or sub-devices, e.g., a monitor image receiver (TV monitor), a TV tuner, a video deck, or an amplifier, etc. included in other devices are controlled from devices. Further, through the bi-directional bus, data for displaying, on a TV monitor, e.g., the operating state (status) of device or sub-device is transmitted. In addition, as an access system of the bi-directional bus, so called CSMA/CD (Carrier Sense Multiple Access with Collision Detection) is employed in, e.g., D2B.

Namely, communication from a sub-device included in a device to a sub-device included in any other device (hereinafter referred to as communication from sub-device to sub-device), communication from a sub-device included in a device to any other device (hereinafter referred to communication from sub-device to device), communication from a device to a sub-device included in any other device (hereinafter communication from device to sub-device), and communication from a device to any other device are carried out through the bi-directional bus.

The format of a transmit signal used in a bi-directional bus as described above, e.g., D2B will now be described. In D2B, control commands for controlling a sub-device of destination (on the receiving side), etc. or data indicating the operating state, etc. are caused to have a frame configuration as shown in FIG. 1, and are transmitted through the bi-directional bus.

Namely, one frame consists of a header field 101 for specifying the header indicating the leading portion of the frame, a master address field 102 for specifying a source device address, a slave address field 103 for specifying a destination device address, a control field 104 for specifying a data communication command indicating communication of data or a control command communication command indicating communication of control command, and a data field 105 for specifying control command or data.

The header of the header field 101 consists of, as shown in FIG. 2, a start bit 101a of one bit for providing synchronization, and mode bits 101b for prescribing a transmission speed (rate) or the number of bytes of the data field 105. These mode bits 101b are 1~3 bits. At present, three modes of mode 0 where the data field 105 is comprised of 2 bytes at the maximum, mode 1 where the data field 105 is comprised of 32 bytes at the maximum (16 bytes at the maximum in the case of communication from slave to master), and mode 2 where the data field 105 is comprised of 128 bytes at the maximum (64 bytes at the maximum in the case of communication from slave to master) are standardized.

The source device address of the master address field 102 consists of, as shown in the above-mentioned FIG. 2, master address bits 102a of 12 bits for specifying a source device address, and a parity bit 102b of 1 bit.

The destination device address of the slave address field 103 consists of, as shown in the above-mentioned FIG. 2, a slave address bits 103a of 12 bits for specifying a destination device address, a parity bit 103b of 1 bit, and an acknowledge bit 103c of 1 bit for responding from a destination device.

To the control field 104, as shown in the above-mentioned FIG. 2, control bits 104a of 4 bits comprised of a data communication command indicating communication of data or a control command communication command indicating communication of control command, i.e., data communication command indicating that the control of the data field 105 is data and control command communication command indicating that it is control command, a parity bit 104b of 1 bit, and an acknowledge bit 104c of 1 bit are assigned.

In the data field 105, as shown in the above-mentioned FIG. 2, data bits 105a of 8 bits, end of data bit 105b of 1 bit, parity bit 105c of 1 bit, and acknowledge bit 105d of 1 bit are repeated as occasion demands. Assuming now that data bits 105a are assumed to be data #1, #2, #3, . . . in order from the beginning, in communication of, e.g., control command, e.g., Operation code (hereinafter referred to as OPC) "Begin 2" (i.e., code "BD"h (h represents hexadecimal number)) indicating communication relating to sub-device, OPC "Begin 1" ("BC"h) indicating communication through HBS, and OPC "Begin 0" ("BB"h) indicating communication through other bus, etc. are assigned (allocated) to data #1. Further, e.g., in communication of data, data are assigned to data #1, #2 #3 . . . every byte (8 bits).

OPR with respect to the above-described OPCs, e.g., OPR with respect to OPC "begin 2" consists of, as shown in FIG. 3, bits b5, b4, b3, b2 (b7 is the Most Significant Bit (MSB) for identifying service codes of the Communication Telephony (CT) system, the Audio Video and Control (AV/C) system, and the Housekeeping (HK) system, etc.; and bits b1, b0 indicating any one of communication from sub-device to sub-device, communication from sub-device to device, communication from device to sub-device, and communication from device to device, viz., indicating presence or absence of Source Sub-Device Address (hereinafter referred to as SSDA) or Destination Sub-Device Address (hereinafter referred to as DSDA). It is to be noted that bit b7 is caused to be always zero, and bit b6 is reserved for future standardization and is caused to be 1 at present. In more practical sense, b1=0, b0=0 indicates communication from sub-device to sub-device; b1=0, b0=1 indicates communication from sub-device to device; b1=1, b0=0 indicates communication from device to sub-device; and b1=1, b0=1 indicates communication from device to device.

Now, in the case of transmitting data having a data quantity greater than a data capacity of the data field 105 from VTR to TV in a manner divided into a plurality of frames, VTR forms, as shown in FIG. 4A, a frames P1 in which master address bits are caused to be an address of VTR, slave address bits are caused to be an address of TV, control bits are caused to be a code "A"h indicating control communication command, and OPC "Begin 2", code "54" indicating presence of SSDA and DSDA, address of, e.g., of video deck, address of, e.g., TV monitor, code "EO"h indicating control of display, code "20"h indicating, e.g., first line on screen, code "22"h indicating, e.g., character of the standard size, and code "21"h indicating, e.g., small letter of alphabet are respectively assigned to data #1, (OPC), data #2 (OPR), data #3 (SSDA), data #4 (DSDA), data #5 (OPC), data #6 (OPR1). data #7 (OPR2), and data #8 (OPR3) are assigned.

Then, VTR detects presence or absence of so called a carrier on the bi-directional bus to transmit this frame P1 when there is no carrier, i.e., the bi-directional bus is empty, thereafter to once stop sending of carrier to open the bi-directional bus. Thus, VTR informs TV that data is transmitted at subsequent frame, carries out a control to lock TV, and informs kind (attribute) of data. It is to be noted that SSDA and DSDA are assigned according to need. For example, in communication from sub-device to device, DSDA is unnecessary. In communication from device to sub-device, SSDA is unnecessary. In addition, in communication from device to device, SSDA and DSDA are unnecessary.

Then, VTR forms, as shown in FIG. 4B, a frame P2 in which master address bits, slave address bits and control bits are caused to be respectively address of VTR, address of TV and code "B"h indicating data communication command, and data of, e.g., 32 bytes at the maximum are assigned to data #1, #2, #3 . . . to transmit this frame P2 when the bi-directional bus becomes empty for a second time. This operation is continued until a line displayed is changed.

Then, VTR transmits, as shown in FIG. 5A, in order to give an instruction of line change, a frame P3 in which master address bits, slave address bits and control bits are caused to be respectively address of VTR, address of TV and code "A"h (control command communication command), and code "EO"h (control command of display), code "21"h indicating, e.g., second line on screen, code "21"h indicating, e.g., capital of alphabet are respectively assigned to data #1 (CPC), data #2 (OPR1), data #3 (OPR2) and data #4 (OPR3) to subsequently transmit, as shown in FIG. 5B, a frame P4 in which master address bits, slave address bits and control bits are caused to be respectively address of VTR, address of TV and code "B"h (data communication command), and the remaining data are assigned to data #1, #2, #3 . . . .

Thereafter, VTR transmits, as shown in FIG. 5C, a frame P4 in which master address bits, slave address bits and control bits are respectively address of VTR, address of TV and code "E"h (control command communication command), and end command (code "BE"h) indicating that communication is completed is assigned to data #1 (OPC) to inform TV that communication of data has been completed, and to carry out a control to release lock of TV. Thus, transmission of data from VTR to TV is completed. TV displays character, etc. based on this data.

On the other hand, even in the case where data quantity of data to be transmitted is less than data capacity of the data field 105 and data to be transmitted can be transmitted by one frame, in the conventional bi-directional bus system, in order to inform that data is transmitted at subsequent frames, a frame in which control bits are caused to be control command communication command is transmitted thereafter to transmit a frame including data thereafter to transmit a frame in which control bits are caused to be control command communication command in order to inform a device on the receiving side that communication has been completed.

Namely, VTR transmits frame P1 (not shown) in which master address bits, slave address bits and control bits are caused to be respectively address of VTR, address of TV and code "A"h (control command communication command), and OPC "Begin 2", code "54"h address of video deck, address of TV monitor, code "EO"h, code "20"h, code "22"h and code "21"h are respectively assigned to data #1 (OPC), data #2 (OPR), data #3 (SSDA), data #4 (DSDA), data #5 (OPC), data #6 (OPR1), data #7 (OPR2) and data #8 (OPR3), thus to inform TV that this communication is communication of data.

Then, VTR transmits a frame P2 in which master address bits, slave address bits and control bits are caused to be address of VTR, address of TV and code "B"h (data communication command), and data are assigned to data #1, #2, #3 . . . .

Thereafter, VTR transmits frame P3 in which master address bits, slave address bits and control bits are caused to be respectively address of VTR, address of TV and code "E"h (control command communication command), and code "BE"h (end command) indicating that communication of data is completed is assigned to data #1 (OPC), thus to inform TV that communication of data has been completed.

As stated above, in the conventional bi-directional bus system, a source device e.g., VTR forms frames in sequence in accordance with the flowchart shown in FIG. 6 to transmit data.

At step ST1, VTR forms a data setting frame indicating that data is transmitted at subsequent frame to transmit this frame to TV. Then, the operation proceeds to step ST2.

At the step ST2, VTR sets control bits to data communication command. Then, the operation proceeds to step ST3.

At the step ST3, VTR judges whether or not a data quantity X is greater than data capacity n. If so, the operation proceeds to step ST4. If not so, the operation proceeds to step ST6.

At step ST4, VTR forms a frame including n data to transmit this frame. Then, the operation proceeds to step ST5.

At the step ST5, VTR subtracts data capacity n from data quantity X and allows a value obtained by subtraction to be new data quantity, i.e., calculate the remaining data quantity X. Then, the operation returns to the step ST3.

On the other hand, at step ST6, VTR forms a frame including data having data quantity X less than data capacity n to transmit this frame. Then, the operation proceeds to step ST7.

At the step ST7, VTR forms a frame for end command indicating that communication of data is completed to transmit this frame. The operation is completed.

As stated above, in the bi-directional bus system, before actual data is transmitted, a frame for informing a device on the receiving side that data is transmitted at subsequent frames is required, and a frame for informing the device on the receiving side that communication of data is completed at the time point when transmission of data is completed is required, resulting in the problems that the traffic quantity is increased, the transmission efficiency is low, and the communication procedure (protocol) is complex, etc.

Further, in the case where equipments of different makers (manufactures) are connected through a bi-directional bus to carry out data transmission therebetween, standardization of data is required. For example, as described above, in the case of displaying status of VTR on TV, it is necessary to decide language displayed, No. of languages of display, place of display, color of display, or the like. On the other hand, makers have a desire to transmit peculiar data (hereinafter referred to as arbitrary data) for equipments manufactured by themselves to add any value to those equipments, or to exhibit characteristics. However, in the conventional bus system, there was the problem that there is no technique for discriminating between standardized data and arbitrary data.

OBJECT AND SUMMARY OF THE INVENTION

This invention has been made in view of actual circumstances as stated above, and its object is to provide a transmitting method, a receiving method and a communication method for a bi-directional bus system, and a bi-directional bus system, which can reduce the traffic quantity on bi-directional bus, improve the transmission efficiency, and simplify the communication procedure.

To achieve the above-described object, a first transmitting method according to this invention is directed a transmitting method for a bi-directional bus system in which a plurality of devices adapted to execute the operation for a received control command and to carry out communication of data are connected to each other through a bi-directional bus,
wherein one frame of a transmit signal on bi-directional bus consists of an address field for specifying addresses of devices between which communication is carried out, a control field for specifying a data communication command indicating communication of data or a control command communication command indicating communication of control command, and a data field for specifying control command or data,
the transmitting method comprising:
specifying, in transmitting data, the content of the control field of the leading frame as the data communication command, thus to transmit the transmit signal through the bi-directional bus.

Further, a second transmitting method according to this invention is, characterized, in the first transmitting method, in that plural kinds of data are prepared, and information indicating the kind (attribute) of data is inserted at a predetermined position of the data field to transmit the transmit signal.

Further, a third transmitting method is characterized, in the first or second transmitting method, in that information indicating a data quantity of data to be transmitted at a corresponding frame is inserted at a predetermined position of the data field to transmit the transmit signal.

Further, a fourth transmitting method is characterized, in the first or second transmitting method, in that information relating to a manufacturer is inserted at a predetermined position of the data field to transmit the transmit signal.

Further, a fifth transmitting method according to this invention is characterized, in the third transmitting method, in that information relating to a manufacturer is inserted at a predetermined position of the data field to transmit the transmit signal.

Further, a first receiving method according to this invention is directed to a receiving method for a bi-directional bus in which of plurality of devices adapted to execute the operation for a received control command and to carry out communication of data are connected to each other through a bi-directional bus,
the receiving method comprising:
receiving, through the bi-directional bus, a transmit signal having a frame structure consisting of an address field for specifying addresses of devices between which communication is carried out, a control field for specifying a data communication command indicating communication of data or a control command communication command indicating communication of control command, and a data field for specifying control command or data; and
detecting on the basis of the control field of the leading frame of the received transmit signal whether a communication carried out is communication of data or communication of control command, whereby when it is judged that communication carried out is communication of data, the content of the data field of the frame is recognized to be specified as data, thus to receive that data.

Further, a second receiving method according to this invention is characterized, in the first receiving method, in that information indicating the kind (attribute) of data is inserted at a predetermined position of the data field,
the receiving method comprising:
recognizing the kind of data received on the basis of this information.

Further, a third receiving method according to this invention is characterized, in the first or second receiving method, in that information indicating a data quantity of a corresponding frame is inserted at a predetermined position of the data field,
the receiving method comprising:
recognizing a data quantity of the received frame received on the basis of said information.

Further, a fourth receiving method according to this invention is characterized, in the first or second receiving method, in that information relating to a manufacturer is inserted at a predetermined position of the data field,
the receiving method comprising
recognizing the manufacture on the basis of the information.

Further, a fifth receiving method according to this invention is characterized, in the third receiving method, in that information relating to a manufacturer is inserted at a predetermined position of the data field,
the receiving method comprising
recognizing the manufacturer on the basis of the information.

Further, a first communication method according to this invention is directed to a communication method for a bi-directional bus system in which a plurality of devices adapted to execute the operation for a received control command and to carry out communication of data,
a device of the transmitting source being adapted to transmit, through the bi-directional bus, a transmit signal having a frame structure consisting of an address field for specifying addresses of devices between which communication is carried out, a control field for specifying a data communication command indicating communication of data or a control command communication command indicating communication of control commands, and a data field for specifying a control command or data, whereby, in transmitting data, the device of the transmitting source specifies the content of the control field of the leading frame as the data communication command to transmit the transmit signal through the bi-directional bus:
a device on the receiving side being adapted
to receive the transmit signal through the bi-directional bus
to detect on the basis of the control field of the leading frame of the received transmit signal whether a communication carried out is the communication of data or the communication of control command, whereby when it is detected when the communication carried out is the communication of data, the device on the receiving side recognizes that the content of the data field of the frame is specified as data to receive the data.

Further, a second communication method according to this invention is, in the first communication method, in that plural kinds of data are prepared,
the source device of the transmitting source being operative to insert information indicating the kind of data at a predetermined position of the data field to transmit the transmit signal,
the device on the receiving side being operative to recognize the kind of received data on the basis of the information.

Further, a third communication method according to this invention is, in the first or second communication method, in that the device of the transmitting source being operative to insert information indicating a data quantity of data to be transmitted at the frame at a predetermined position of the data field to transmit the transmit signal,
the device on the receiving side being operative to recognize the data quantity of received data on the basis of the information.

Further, a fourth communication method according to this invention is characterized, in the first or second communication method, in that
the device of the transmitting source being operative to insert information relating to a manufacturer at a predetermined position of the data field to transmit the transmit signal,
the device on the receiving side being operative to recognize a manufacturer on the basis of the information.

Further, a fifth communication method according to this invention is characterized, in the third communication method,
the device on the transmitting source being operative to insert information relating to a manufacturer at a predetermined position of the data field to transmitted the transmit signal,
the device on the receiving side being operative to recognize the manufacture on the basis of the information.

Further, a first bi-directional bus system according to this invention is directed to a bi-directional bus system comprising a plurality of devices adapted to execute the operation for a received control command and to carry out communication of data,
each of the plurality of devices comprising:
transmit signal formation means for forming a transmit signal having a frame structure consisting of an address field for specifying addresses of devices between which communication is carried out, a control field for specifying a data communication command indicating communication of data or a control command communication command indicating communication of control command, whereby, in transmitting data, the transmit signal formation means specifies the content of the control field of the leading frame as the data communication command to form the transmit signal;
bus output means for outputting the transmit signal formed by the transmit signal formation means to the bi-directional bus;
bus input means adapted to receive the transmit signal through the bi-directional bus; and
control means adapted to detect on the basis of the control field of the leading frame of the transmit signal received by the bus input means whether a communication carried out is communication of data or communication of command, whereby when it is detected that the communication carried out is communication of data, the control means recognizes that the content of the data field of the frame is specified as data to carry out a control to receive data,
the plurality of devices being connected to each other through the bi-directional bus.

Further, a second bi-directional bus system according to this invention is characterized, in the first bi-directional bus system, in that plural kinds of data are prepared,
the transmit signal formation means being operative to insert indicating the kind (attribute) of data at a predetermined position of the data field to form the transmit signal,
the control means being operative to recognize the kind of received data on the basis of the information.

Further, a third bi-directional bus system according to this invention is characterized, in the first or second bi-directional bus system, in that
the transmit signal formation means being operative to insert, at a predetermined position of the data field, information indicating a data quantity of data to be transmitted at the frame of the data field to form the transmit signal,
the control means being operative to recognize the data quantity of the received frame on the basis of the information.

Further, a fourth bi-directional bus system according to this invention is characterized, in the first or second bi-directional bus system, in that,
the transmit signal formation means being operative to insert information relating to a manufacturer at a predetermined position of the data field,
the control means being operative to recognize the manufacture on the basis of the information.

Finally, a fifth bi-directional bus system according to this invention is characterized, in the third bi-directional bus system, in that
the transmit signal formation means being operative to insert information relating to a manufacturer at a predetermined position of the data field to form the transmit signal,
the control means being operative to recognize the manufacturer on the basis of the information.

In the transmitting method according to this invention, one frame of a transmit signal on the bi-directional bus consists of an address field for specifying addresses of devices between which communication is carried out, a control field for specifying a data communication command indicating communication of data or a control command communication command indicating communication of control command, and a data field for specifying control command or data. In transmitting data, the transmitting method comprises: specifying the content of the control field of the leading frame as the data communication command to transmit the transmit signal through the bi-directional bus.

Further, in the transmitting method according to this invention, plural kinds of data are prepared, and information indicating the kind of data is inserted at a predetermined position of the data field to transmit the transmit signal.

Further, in the transmitting method according to this invention, information indicating data quantity of data to be transmitted at this frame is inserted at a predetermined position of the data field to transmit the transmit signal.

Further, in the transmitting method according to this invention, information relating to a manufacturer is inserted at a predetermined position of the data field to transmit the transmit signal.

Further, in the receiving method according to this invention, a transmit signal having a frame structure consisting of address field for specifying address of devices between which communication is carried out, a control field for specifying a data communication command indicating communication of data or control command communication command indicating communication of control command, and a data field for specifying control command or data is received through the bi-directional bus to detect on the basis of the control field of the leading frame of the received transmit signal whether communication carried out is communication of data or communication of control command, whereby when it is detected that the communication carried out is communication of data, the content of the data field of the frame is recognized to be specified as communication of data to receive data.

Further, in the receiving method according to this invention, information indicating the kind of data is inserted at a predetermined position of the data field to recognize the kind of received data on the basis of this information.

Further, in the receiving method according to this invention, information indicating data quantity of frame is inserted at a predetermined position of the data field to recognize data quantity of the received frame on the basis of this information.

Further, in the receiving method according to this invention, information relating to manufacturer is inserted at a predetermined position of the data field to recognize the manufacture on the basis of this information.

Further, in the communication method according to this invention, device of the transmitting source is such that one frame of a transmit signal on the bi-directional bus consists of an address field for specifying addresses of devices between which communication is carried out, a control field for specifying a data communication command indicating communication of data or a control command communication command indicating communication of control command, and a data field for specifying control command or data, whereby, in transmitting data, the device of the transmitting source specifies the content of the control field of the leading frame as the data communication command to transmit the transmit signal through the bi-directional bus. Device on the receiving side receives the transmit signal through the bi-directional bus to detect on the basis of the control field of the leading frame of the received transmit signal to detect whether communication carried out is communication of data or communication of control command, whereby when it is detected that communication carried out is communication of data, the device on the receiving side recognizes that the content of the data field of the frame is specified as data to receive data.

Further, in the communication method according to this invention, plural kinds of data are prepared. The transmitting source device inserts information indicating the kind of data at a predetermined position of the data field to transmit the transmit signal. The receiving side device recognizes the kind of received data on the basis of this information.

Further, in the communication method according to this invention, the transmitting source device inserts information indicating data quantity of data to be transmitted at this frame at a predetermined position of the data field to transmit the transmit signal. The receiving side device recognizes the data quantity of the received frame on the basis of this information.

Further, in the communication method according to this invention, the transmitting source device inserts information relating to manufacturer at a predetermined position of the data field to transmit the transmit signal. The receiving side device recognizes the manufacturer on the basis of this information.

Further, in the bi-directional bus system according to this invention, each transmit signal formation means of a plurality of devices forms a transmit signal having a frame structure consisting of an address field for specifying addresses of devices between which communication is carried out, a control field for specifying data communication command indicating communication of data or control command communication command indicating communication of control command, and a control field for specifying control command or data, whereby, in transmitting data, the transmit signal formation means specifies the content of the control field of the leading frame as the data communication command, thus to form the transmit signal. The bus output means outputs the transmit signal formed by the transmit signal formation means to the bi-directional bus. On the other hand, each bus input means of the plurality of devices receives the transmit signal through the bi-directional bus. The control means detects on the basis of the control field of the leading frame of the received transmit signal whether communication carried out is communication of data or communication of control command, whereby when it is detected when communication carried out is communication of data, the control means recognizes that the content of the data field of this frame is specified as data to carry out a control to receive data.

Further, in the bi-directional bus system according to this invention, plural kinds of data are prepared. The transmit signal formation means inserts information indicating the kind of data at a predetermined position of the data field to form transmit signal. The control means recognizes received data on the basis of this information.

Further, in the bi-directional bus system according to this invention, transmit signal formation means of the transmitting source device inserts information indicating data quantity of data to be transmitted at this frame to form transmit signal. Control means of device on the receiving side recognizes data quantity of a received frame on the basis of this information.

In addition, in the bi-directional bus system according to this invention, transmit signal formation means of device of the transmitting source inserts information relating to manufactures at a predetermined position of the data field to form a transmit signal. Control means of device on the receiving side recognizes the manufactures on the basis of this information.

BRIEF DESCRIPTION OF THE DRAWINGS

FIG. 3 is a view for explaining OPR of OPC "Begin 2".

FIGS. 4A–4B are views showing an actual example of a conventional communication procedure (protocol) when communication is carried out with data being divided into a plurality of frames.

FIGS. 5A–5C are views showing an actual example of the conventional communication procedure (protocol) when communication is carried out with data being divided into a plurality of frames.

FIG. 12 is a view showing a format of HDOPR of a transmit signal.

DESCRIPTION OF THE PREFERRED EMBODIMENT

A preferred embodiment of a transmitting method, a receiving method, and a communication method for a bi-directional bus system and a bi-directional bus system will now be described with reference to the attached drawings. In the embodiment, this invention is applied to D2B (Audio, Video and audiovisual systems Domestic Digital Bus) standardized by the publication 1030 of the so-called IEC, or Home Bus System (hereinafter abbreviated as HBS) standardized by ET-2101 of EIAJ.

Figure 7:
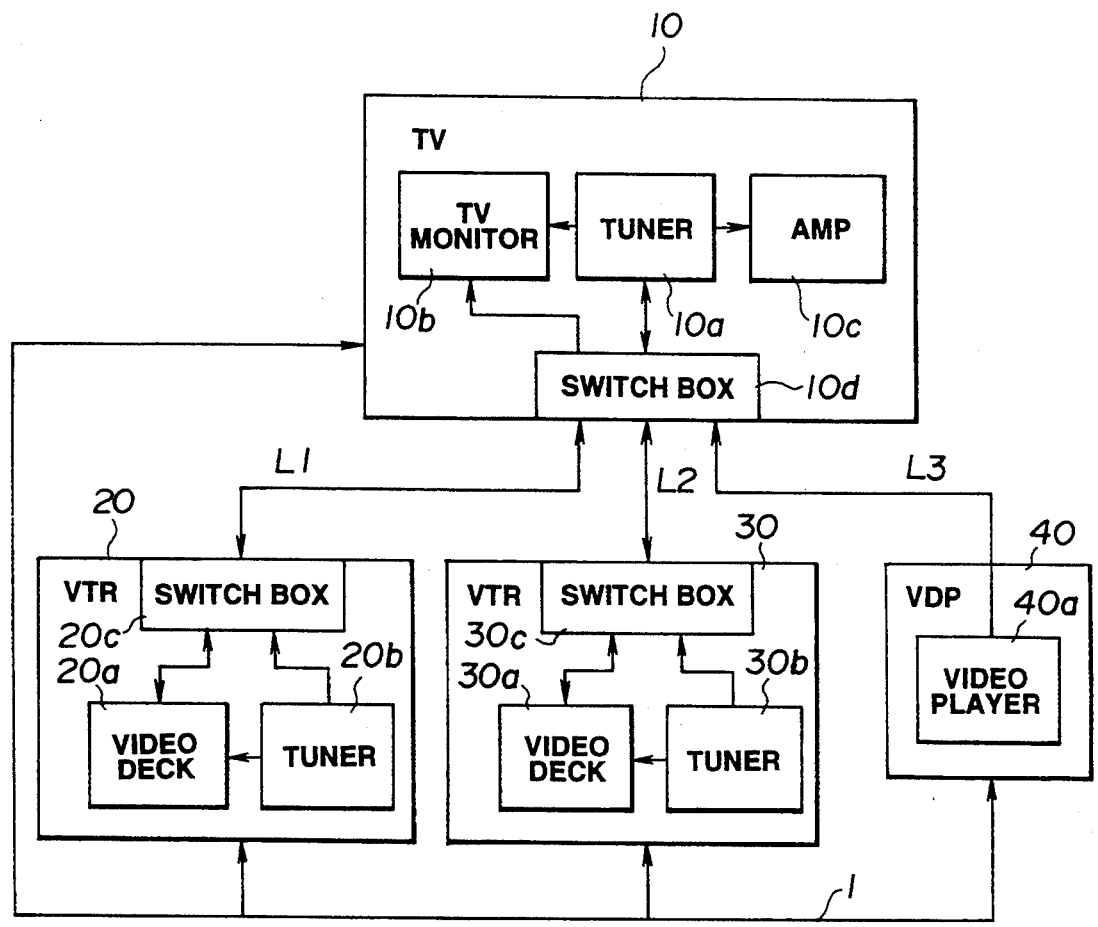
FIG. 7 is a block diagram showing an actual configuration of a bi-directional bus system to which this invention is applied.

A bi-directional bus system to which this invention is applied has a configuration such that a television image receiver (hereinafter abbreviated as TV) 10 which is a device, video tape recorders (hereinafter each abbreviated as VDP) 20, 30 which are a device, and a video deck player (hereinafter abbreviated as VDP) 40 which is a device are connected to each other through a bi-directional bus 1, as shown in FIG. 7, for example.

The TV10 includes therein, as a sub-device, as shown in the above-mentioned FIG. 7, a tuner 10a adapted to receive a television (broadcasting) signal to reproduce a video signal and an audio signal therefrom, a TV monitor 10b for displaying a picture based on the video signal reproduced at the tuner 10a, and an amplifier 10c for amplifying the audio signal reproduced by the tuner 10a, and further comprises, as a sub-device, a switch box 10d for outputting to the external a video signal/audio signal (hereinafter referred to as an AV signal) from the tuner 10a, or delivering the AV signal inputted from the external to the tuner 10a and the TV monitor 10b.

Further, the VTR 20 includes as a sub-device therein, as shown in the above-mentioned FIG. 7, a video deck 20a adapted for recording an AV signal onto a magnetic tape, or reproducing the AV signal therefrom, and a tuner 20b adapted to receive a television (broadcasting) signal to reproduce an AV signal therefrom, and further comprises, as a sub-device, a switch box 20c adapted for outputting an AV signal from the video deck 20a or the tuner 20b to the external, or delivering an AV signal inputted from the external to the video deck 20a.

Further, the VTR30 includes therein, as a sub-device, a video deck 30a, a tuner 30b, and a switch box 30c similarly to the above-described VTR20.

In addition, the VDP 40 includes, as a sub-device, a video player 40a for reproducing an AV signal from an optical disk.

In this bi-directional bus system, e.g., video signals reproduced by VTR20, VTR30, VDP40 are delivered to the TV10 to display a picture based on this video signal on TV monitor 10b. In actual terms, the switch box 10d of the TV10 and the switch box 20c of the VTR20 are connected by an AV signal line L1, the switch box 10d of the TV10 and the switch box 30c of the VTR30 are connected by an AV signal line L2, and the switch box 10d of the TV10 and the video player 40a are connected by an AV signal line L3, viz., AV signal lines L1, L2, L3 are wired in a star form with the TV10 being as a center. Accordingly, AV signals reproduced by VTR20, VTR30, VDP40 are respectively delivered to the TV monitor 10b through AV signal lines L1, L2, L3 and switch box 10d. Thus, pictures corresponding thereto are displayed on the TV monitor 10b. Further, e.g., an AV signal reproduced by the video player 40a is delivered to video deck 20a through AV signal line L3, switch box 10d, AV signal line L1, and switch box 20c. Thus, they are recorded (image-recorded) onto a magnetic tape by video deck 20a.

Further, in this bi-directional bus system, e.g., the TV10 (device) controls, through the bi-directional bus 1, VTRs20, 30, VDP40 (devices) or video decks 20a, 30a, video player 40a, switch box 20c, 30c (sub-devices) included therein.

Further, in this bi-directional bus system, e.g., from VTRs 20. 30, VDP40, data indicating status, etc. thereof are delivered to TV10 through bi-directional bus 1 as frame (so called packet) structure. TV10 displays, on TV monitor 10b, character, etc. based on these data.

Figure 8:
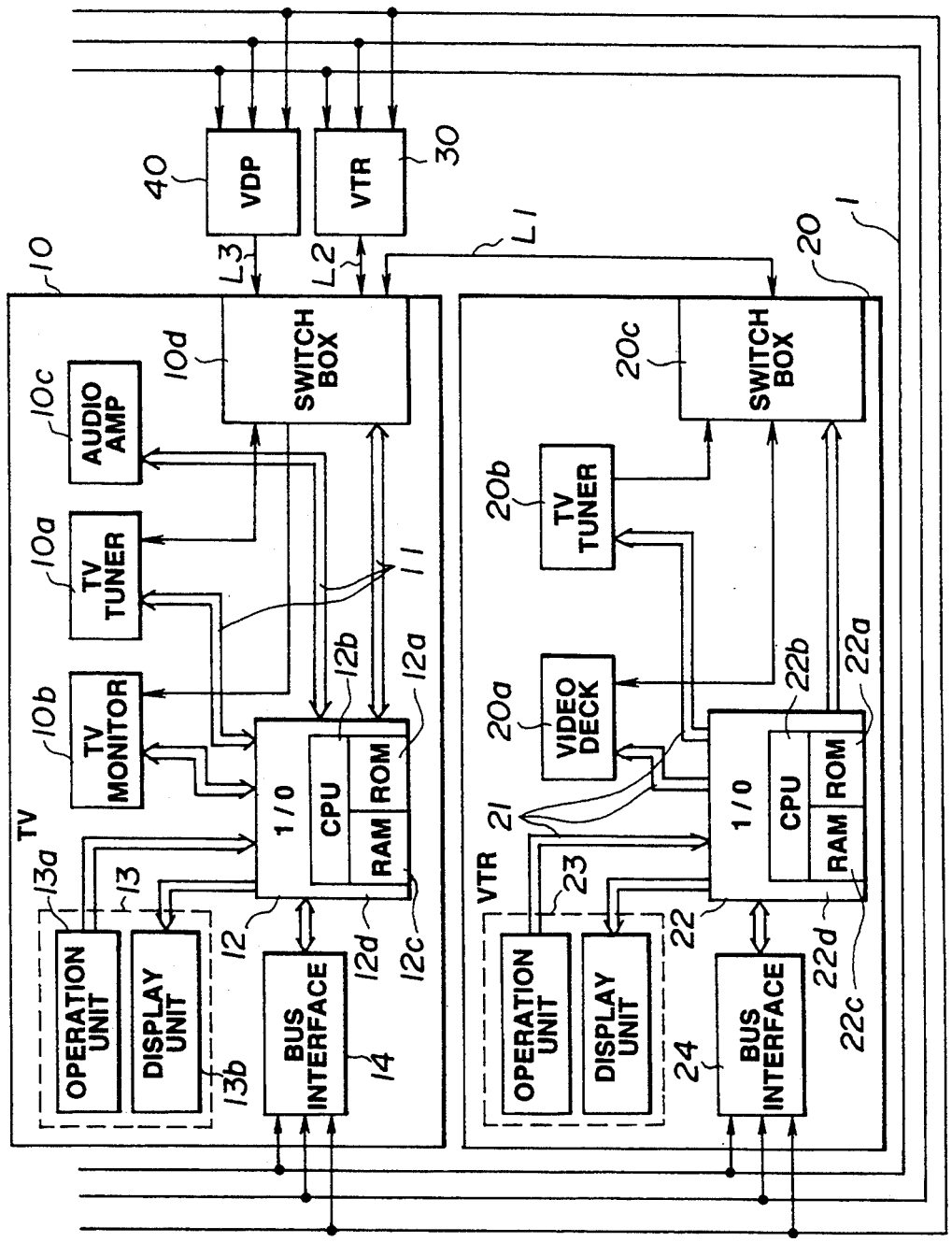
FIG. 8 is a block diagram showing an actual configuration of tv, vtr constituting the above-mentioned bi-directional system.

In actual terms, the TV10 comprises, as shown in FIG. 8, for example, a microprocessor 12 for controlling the tuners 10a∼ switch box 10d through internal control bus 11, a user interface unit 13 for inputting operation contents operated by user to the microprocessor 12, and a bus interface circuit 14 for inputting a transmit signal consisting of control commands for controlling other devices and sub-devices thereof or data indicating status, etc. from the bi-directional bus 1 and outputting it thereto.

Further, VTR20 comprises, as shown in the above-mentioned FIG. 8, a microprocessor 22 for controlling the video deck 20a∼switch box 20c through an internal control bus 21, a user interface unit 23 for inputting operation contents operated by user to the microprocessor 22, and a bus interface circuit 24 for inputting a transmit signal from the bi-directional bus 1 or outputting it thereto. Further, VTR30, VDP40 similarly comprise a microprocessor and a bus interface circuit (not shown), etc.

In operation, when, e.g., user operates the user interface unit 13 of TV10 for the purpose of viewing, on TV10, a picture based on a video signal reproduced by VTR20, microprocessor 12 of TV10 forms a transmit signal in accordance with an operation content to transmit this transmit signal to the VTR20 through bus interface circuit 14 and the bi-directional bus 1. The microprocessor 22 of VTR20 carries out a control to play (reproduce) the video deck 20a through internal control bus 21 on the basis of the transmit signal received by bus interface circuit 24, and controls the switch box 20c so that an AV signal reproduced by the video deck 20a is delivered to TV10.

Namely, the user interface unit 13 comprises, as shown in the above-mentioned FIG. 8, an operation unit 13a provided with, e.g., a key switch, etc., and a display unit 13b provided with, e.g., a light emitting diode, etc. The operation unit 13a delivers a signal corresponding to an operation content that user has operated by using a key switch, etc. to microprocessor 12 through internal control bus 11.

The microprocessor 12 comprises, as shown in the above-mentioned FIG. 8, a Read Only Memory (hereinafter referred to as ROM) in which command Tables for converting received control commands to internal control commands for controlling the tuner 10a∼switch box 10d or various programs such as a program for displaying a picture based on received data on TV monitor 10b, etc. are stored, a Central Processing Unit (hereinafter referred to as a CPU) 12b for executing the program stored in the ROM12a, a Random Access Memory (hereinafter referred to as a RAM) 12c for storing result of the execution, or the like, and an I/O circuit 12d adapted to interface with the tuner 10a∼bus interface circuit 14.

CPU 12b executes program stored in ROM12b to thereby generate a control command for controlling, e.g., VTR20 on the basis of a signal delivered through internal control bus 11, I/O circuit 12d from operation unit 13a to deliver this control command to bus-interface circuit 14 as a frame structure.

Further, CPU 12b delivers data such as status, etc. to bus interface circuit 14 as a frame structure, and carries out a control to display, e.g., status of VTR20 such as character, etc based on data received through bus interface circuit 14 on TV monitor 10b.

The bus interface circuit 14 employs, e.g., so called a CSMA/CD (Carrier Sense Multiple Access with Collision Detection) as an access system for the bi-directional bus 1, and is connected to the bi-directional bus 1 through a connector standardized, e.g., by so called IEC/SC48B (Secretariat) 202.

Figure 9:
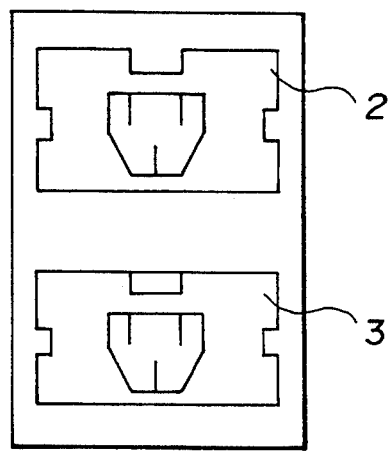
FIGS. 9A–9B are views showing the structure of a connector of bi-directional bus constituting the bi-directional bus system.
Figure 9:
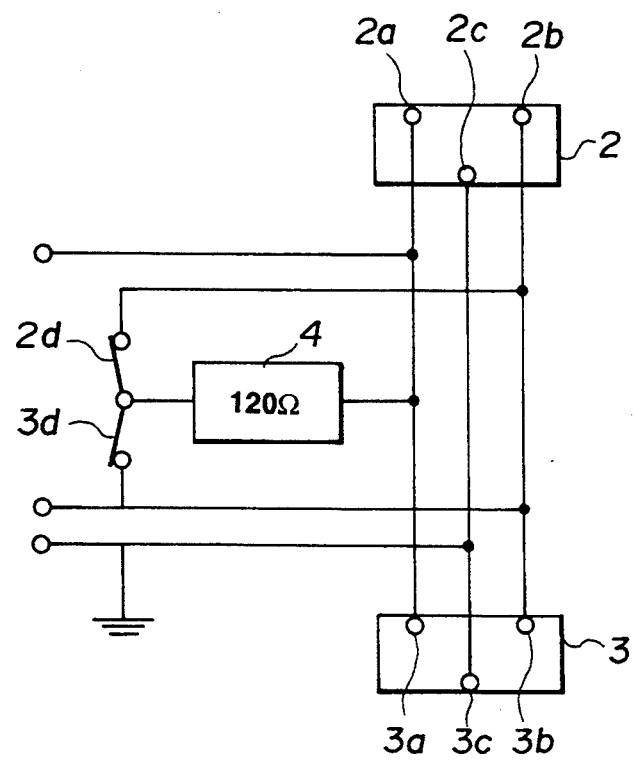

In more practical sense, this connector is provided with, as shown in FIG. 9A, two sockets 2, 3. As shown in FIG. 9B, contacts 2a, 2b for signal, a contact 2c for earth of the socket 2, and contacts 3a, 3b for signal and contact 3c for earth of the socket 3 are connected to each other within the connector. Further, contacts 2a and 2b are connected through a switch 2d and a terminating resistor (e.g., 120 ohm) 4, and contacts 3a and 3b are connected through a switch 3d and the terminating resistor 4.

Connectors constructed in this way are respectively provided every respective devices such as TV10, etc. Like connectors provided in the VTR20, for example, when a plug of the bi-directional bus 1 from the TV10 and a plug of the bi-directional bus 1 from the VTR30 are respectively inserted into sockets 2, 3, the switches 2d, 3d are opened so that the terminating resistor 4 is cut off. As a result, a transmit signal from TV10 is delivered to the bus interface circuit 24 of VTR20, and is delivered to VTR30 or VDP40 of the succeeding stage.

Figure 10:
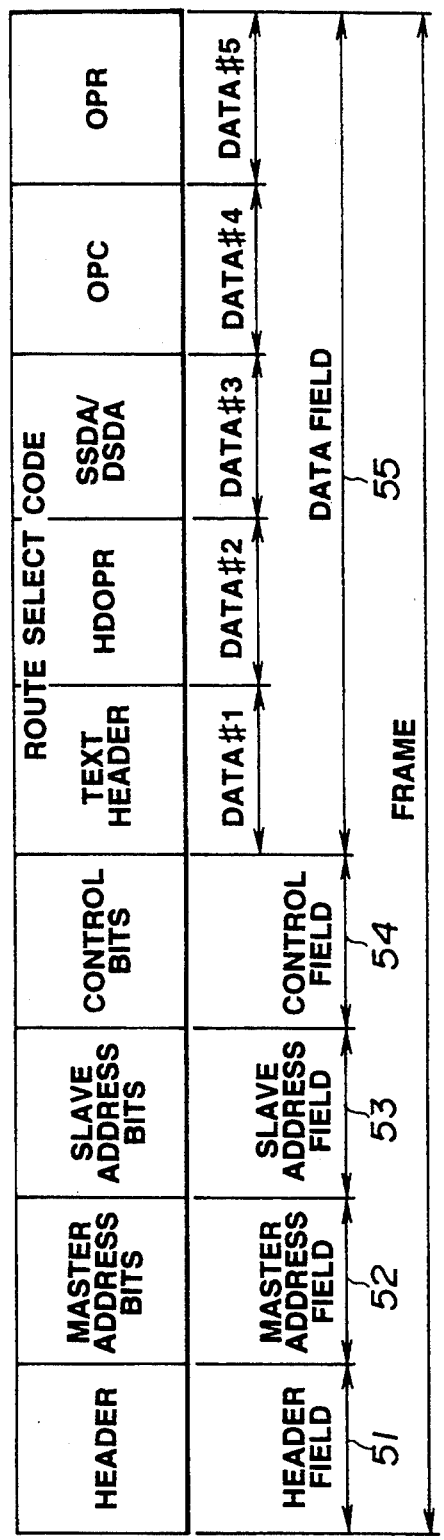
FIG. 10 is a view showing a frame format of a transmit signal for transmitting control command.
Figure 11:
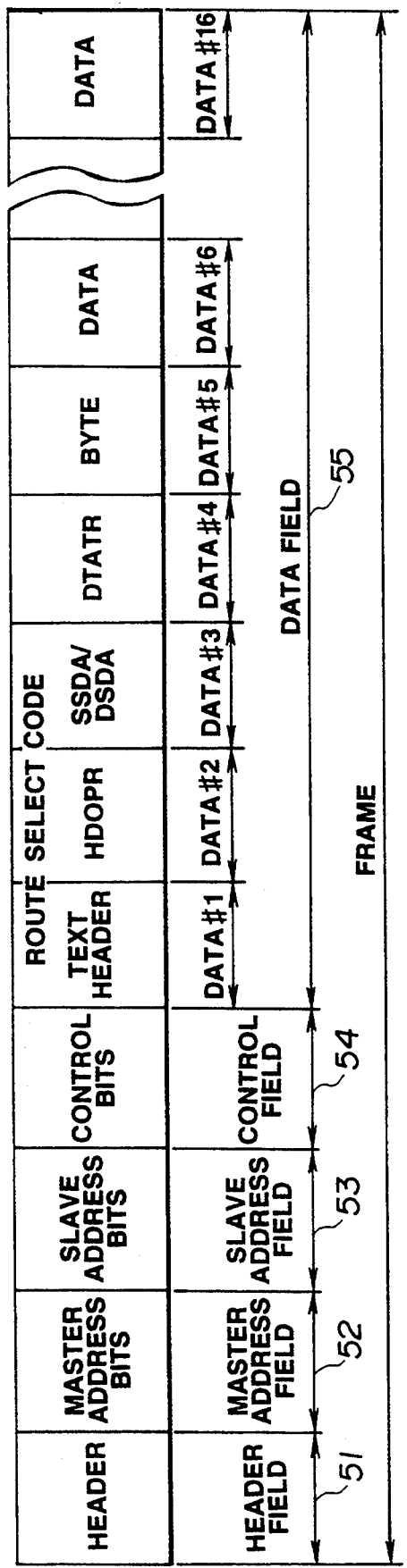
FIG. 11 is a view showing a frame format of a transmit signal for transmitting data.

The format of a transmit signal transmitted on the bi-directional bus 1 will now be described. The format of this transmit signal is substantially in conformity with the format of D2B described in the prior art, and control commands for controlling a destination sub-device, etc. or data for displaying, on TV10, status, etc. are caused to have a frame structure as shown in FIGS. 10, 11. Thus, control commands or data of such frame structure are transmitted.

Namely, one frame consists of a header field 51 for specifying the header indicating the leading portion of the frame, a master address field 52 for specifying a source device address, a slave address field 53 for specifying a destination device address, a control field 54 for specifying data communication command indicating communication of data or control command communication command indicating communication of control command, and a data field 55 for specifying control command or data.

Figure 1:
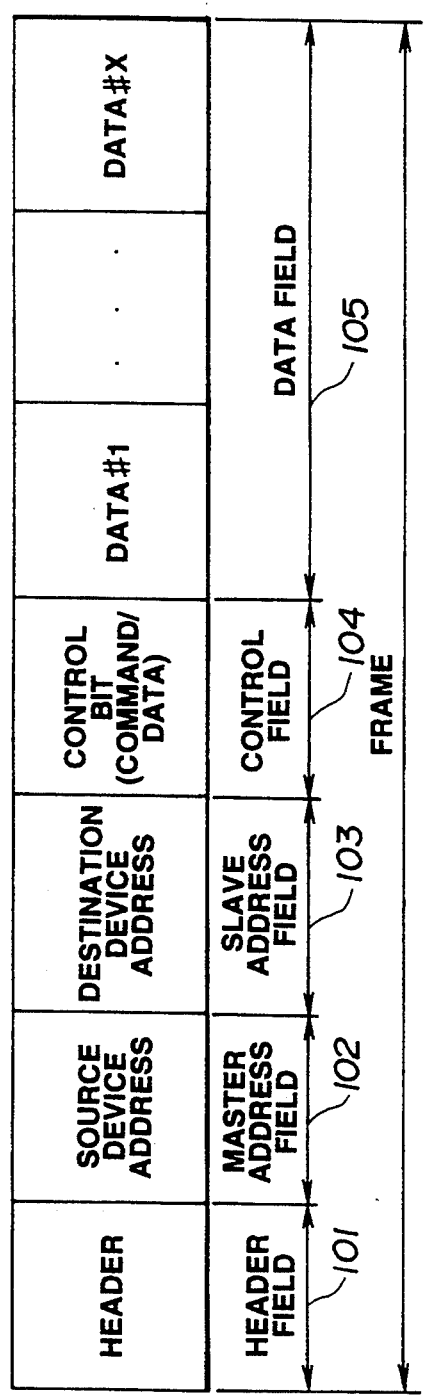
FIG. 1 is a view showing a frame format of the conventional D2B.
Figure 2:
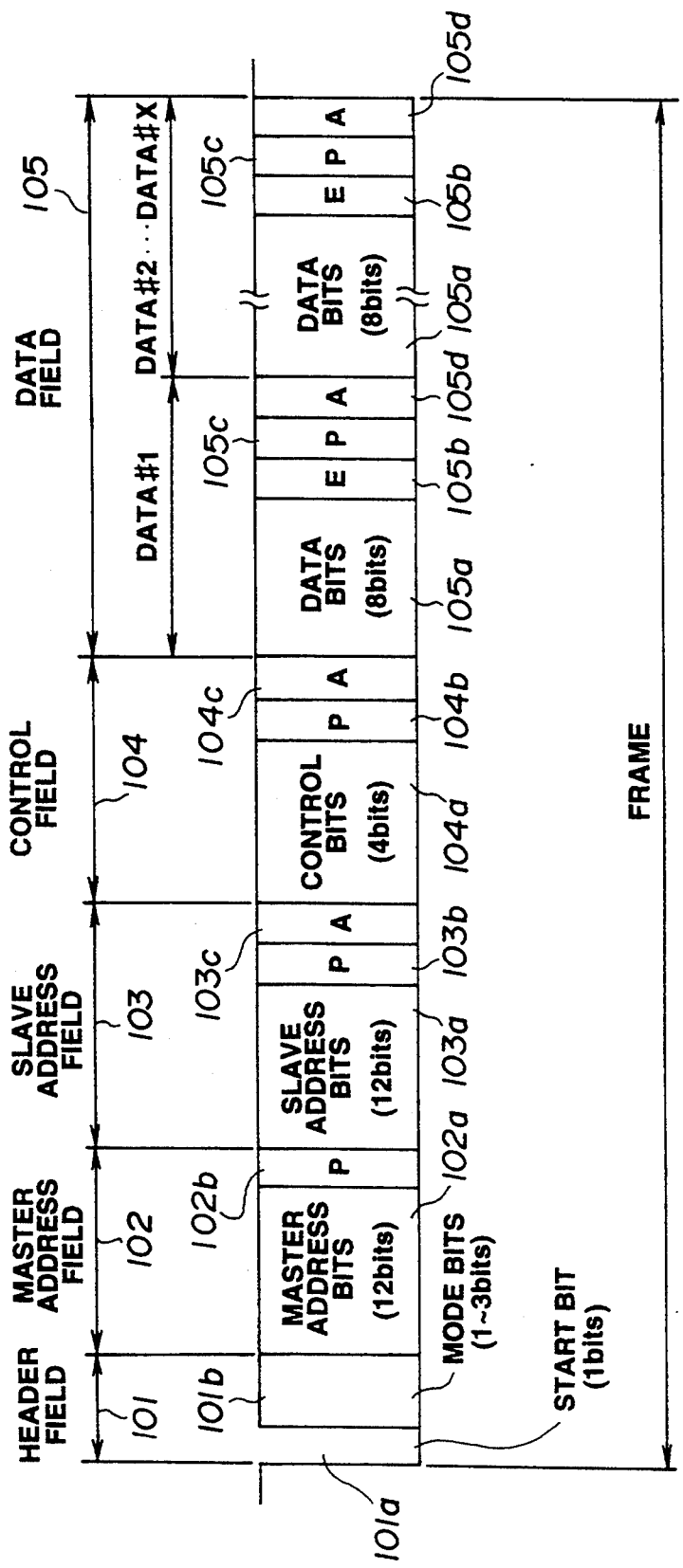
FIG. 2 is a view showing the detail of the frame format of the conventional D2B.
Figure 6:
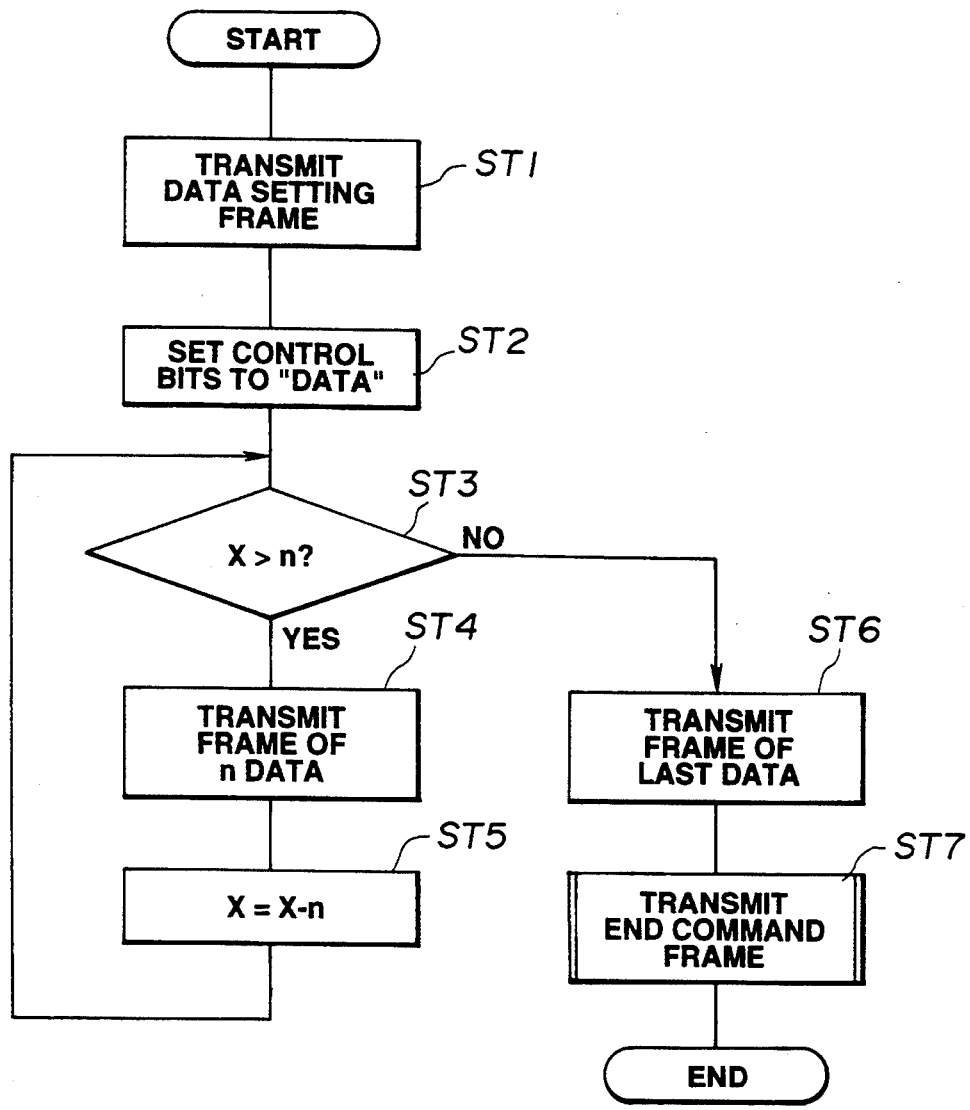
FIG. 6 is a flowchart for explaining the operation for forming frame in the prior art.

The header of the header field 51 is in conformity with the D2B described in the prior art (see FIG. 2), and consists of a start bit of 1 bit for providing synchronization, and mode bits for prescribing a transmission speed or the number of bytes of the data field 55.

The source device address of the master address field 52 is in conformity with the D2B described in the prior art, and consists of master address bits of 12 bits for specifying a source device address, and a parity bit of 1 bit.

The destination device address of the slave address field 53 is in conformity with the D2B described in the prior art, and consists of slave address bits of 12 bits for specifying a destination device address, a parity bit of 1 bit, and an acknowledge bit of one bit for responding from the destination device.

To the control field 54, substantially in conformity with the D2B described in the prior art, control bits of 4 bits comprised of data communication command indicating communication of data or control command communication command indicating communication of control command, i.e. data communication command indicating that the content of the data field 105 is data or control command communication command indicating that it is control command, a parity bit of 1 bit, and an acknowledge bit of 1 bit are assigned. It is to be noted that as the control bit, there are used only code "E"h (h indicates hexadecimal number) indicating write in non-lock state of control command, code "B"h indicating write in lock state of data, and code "F"h indicating write in non-lock state of data, which are codes from master to slave of codes standardized in D2B.

In the data field 55, data bits of 8 bits, end of data bit of 1 bit, parity bit of 1 bit, parity bit of 1 bit, and acknowledge bit of 1 bit are repeated as occasion demands substantially in conformity with the D2B described in the prior art. When data bits are assumed to be data #1, #2, #3 . . . from the beginning in order, a route select code indicating a communication from a sub-device included in a device to any other device, a communication from a device to a sub-device included in any other device, or a communication from a device to any other device is assigned to data #1~data #3 as shown in the above-mentioned FIGS. 10, 11.

This route select code consists of, as shown in the above-described FIGS. 10, 11, a text header of 8 bits, a header operand comprised of 8 bits indicating communication from sub-device included in device to any other device, communication from device to sub-device included in any other device, or communication from device to any other device, and a sub-device address comprised of 8 bits indicating a Source Sub-Device Address (hereinafter referred to as SSDA) or Destination Sub-device Address (hereinafter referred to as DSDA). The text header is assigned to data #1 as "AB"h to discriminate from OPC "Begin 2" (code "BD"h), OPC "Begin 1" ("BC"h), OPC "Begin 0" ("BB"h) used in the conventional D2B.

The header operand (hereinafter referred to as HDOPR) subsequent to the text header is assigned to data #2. For example, as shown in FIG. 12, by bits b1, b0 of the lower order 2 bits (b7 is the most significant bit (MSB)), communication from sub-device included in device to any other device (hereinafter referred to as communication from sub-device to device), communication from device to sub-device included in any other device (hereinafter referred to as communication from device to sub-device), or communication from device to any other device is designated. In more practical sense, b1=0, b0=1 indicates communication from sub-device to device, b1=1, b0=0 indicates communication from device to sub-device, and b1=1, b0=1 indicates communication from device to device. Namely, in this bi-directional bus system, communication from a sub-device included in a device to a sub-device included in any other device used in the conventional D2B is not carried out. In other words, HDOPR where b1=0 and b0=0 is not used.

In communication of control command, as shown in the above-mentioned FIG. 10, control commands, etc. are assigned to data #4 and data subsequent thereto. On the other hand, in communication of data, as shown in the above-mentioned FIG. 11, Data Attribute (hereinafter referred to as DTATR) for discriminating, the kind of data, such as, for example, so called ASCII code, On Screen Data (hereinafter referred to as OSD) for displaying character, etc. on TV monitor, Japanese OSD data, transparent transfer data for transferring a received instruction, e.g., from a remocon to other device as it is, or the like is assigned to data #4, the number of bytes of data (hereinafter referred to as BYTE) included in that frame is assigned to a predetermined position of the data field 55, e.g., data #5 by codes "20"h~"2F"h respectively corresponding to, e.g., 1 byte~16 bytes as shown in the above-mentioned FIG. 11, and data are assigned to data #6 and data subsequent thereto every byte.

Meanwhile, in communication of data, when data capacity of data field 55, e.g., data capacity prescribed by mode bits of the above-described header field 51 is, e.g., 16 bytes and a quantity of data transmitted is more than that, transmit data is transmitted in a manner divided into a plurality of frames, and the above-described control bits of a leading frame, i.e., a frame to be transmitted first are caused to be data communication command, e.g., code "B"h indicating write in lock state of data, and control bits transmitted last are caused to be data communication command, e.g., code "F"h indicating write in non-lock state of data. It is to be noted that when a data quantity of data transmitted is less than data capacity of the data field 55, and data to be transmitted is transmitted by one frame, control bits are caused be data communication command, e.g., code "F"h indicating write in non-lock state of data.

Accordingly, in carrying out communication of control command, e.g., sending a control command for playing, e.g., video deck 20a from TV10 (device) to video deck 20a (sub-device) included in VTR20 (other device), microprocessor 12 of TV10 assigns address of TV10 as master address bits to the master address field 52, assigns address of VTR20 as slave address bits to the slave address field 53, and assigns code "E"h indicating write of control command communication command, e.g., control command from master to slave to the control field 54 as control bits. Further, the microprocessor 12 assigns code "AB"h as text header to data #1, assigns a code (b1=1, b0=0) indicating communication from device to sub-device to data #2 as HDOPR, and assigns address of video deck 20a to data #3 as DSDA. Further, the microprocessor 12 assigns code "C3"h for playing, e.g., the video deck to data #4 subsequent thereto as OPC, and assigns code "75"h indicating forward to data #5 as OPR.

In addition, in transmitting, e.g., from TV (device) to VTR20 (device), a control command to turn OFF power supply, microprocessor 12 assigns code (b1=1, b0=1) indicating communication from device to device to data #2 as HDOPR. In this case, since address of the sub-device is unnecessary, microprocessor 12 assigns a dummy code, e.g., code "7F"h to data #3. Further, the microprocessor 12 assigns, e.g., code "AO"h indicating standby to data #4 as OPC, and assigns code "70"h indicating ON to data #5 as OPR.

Figure 13:
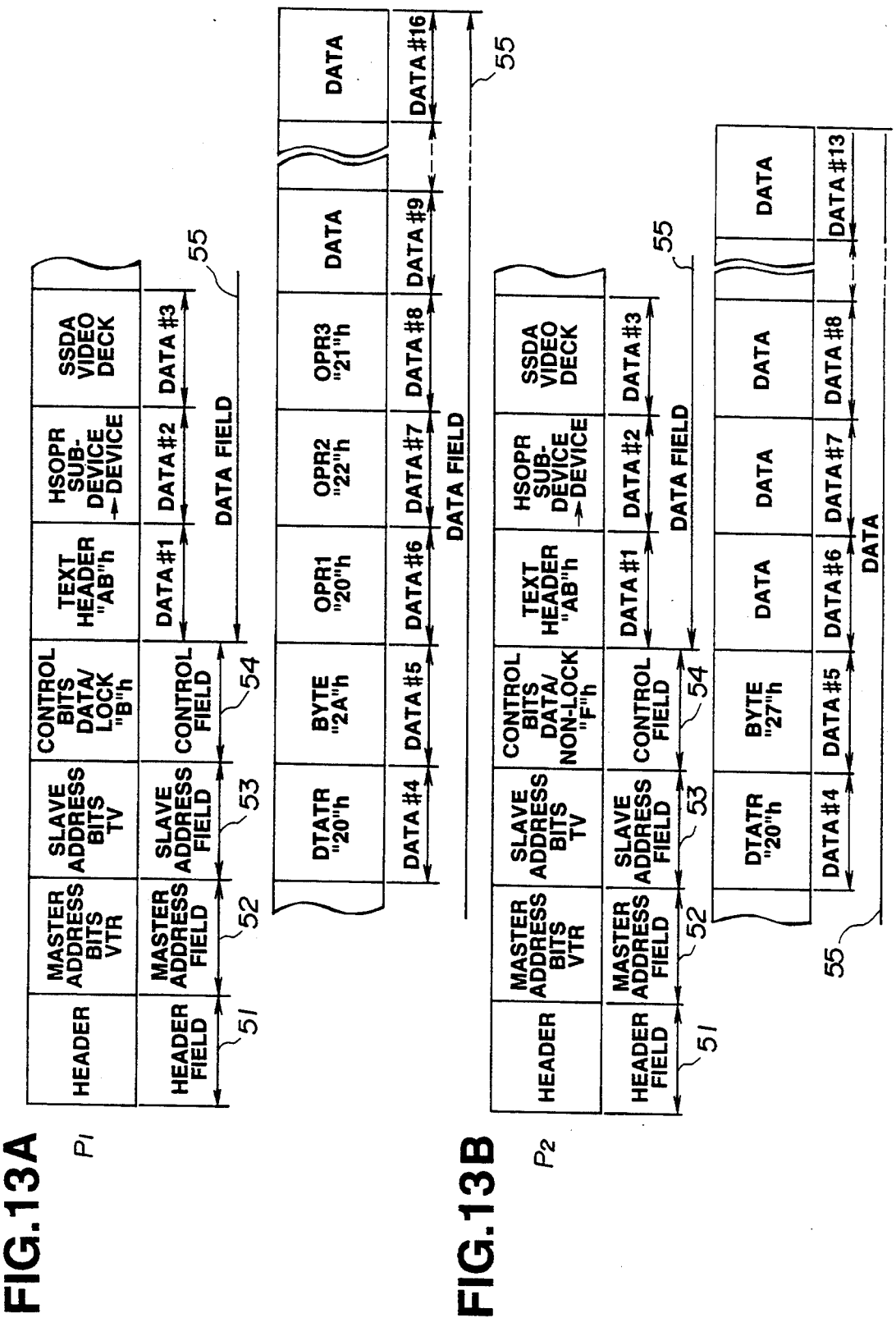
FIGS. 13A–13B are views showing an actual example of the communication procedure (protocol) when communication is carried out with data being divided into a plurality of frames.

On the other hand, in carrying out communication of data, e.g., in transmitting data indicating status, etc. of video deck 20a (sub-device) from VTR20 to TV10 in a manner divided into a plurality of frames, e.g., two frames P1, P2 to display a picture based on those data on TV10, microprocessor 22 of VTR 20 assigns, as shown in FIG. 13, for example, address of VTR20 to the master address field 52 as master address bits, assigns address of TV10 to the slave address field 53 as slave address bits, and assigns data communication command, e.g., code "B"h indicating write in lock state of data from master to slave to the control field 54 as control bits.

Further, the microprocessor 22 assigns code "AB"h to data #1 as text header, assigns code (b1=0, b0=1) indicating communication from sub-device to device to data #2 as HDOPR, and assigns address of video deck 20a to data #3 as SSDA.

Further, microprocessor 22 assigns code "20"h indicating, the kind of data e.g., OSD data to data #4 as DTATR, and assign code "2A"h indicating e.g., that data of 11 bytes are included in this frame to data #5 as BYTE.

Further, microprocessor 22 assigns code "20"h indicating, e.g., first line on screen to data #6 as OPR1, assigns code "22"h e.g., indicating a character of the standard size to data #7 as OPR2, and assigns code "21"h indicating, e.g., small letter (character) of alphabet to data #8 as OPR3.

Then, microprocessor 22 assigns data to be transmitted to data #9~data #16 every byte. Thus, a frame P1 transmitted first is formed.

At a frame P2 transmitted last, as shown in the above-mentioned FIG. 13B, microprocessor 22 assigns address of VTR20 to master address field 52 as master address bits, assigns address of TV10 to slave address field 53 as slave address bits, and assigns data communication command, e.g., code "F"h indicating write in non-lock state of data from master to slave to control field 54 as control bits.

Further, microprocessor 22 assigns code "AB"h to data #1 as text header, assigns code (b1=0, b0=1) indicating communication from sub-device to device to data #2 as HDOPR, and assigns address of video deck 20a to data #3 as SSDA.

In addition, microprocessor 22 assigns code "20"h indicating the kind of data, e.g., OSD data to data #4 as DTATR, and assigns code "27"h indicating that data of 8 bytes are included in this frame to data #5 as BYTE.

Meanwhile, when, e.g., display condition on screen is not changed, i.e., character of the same size, etc. is displayed on the same line, the above-described OPR-1~OPR3 become unnecessary. Microprocessor 22 assigns data to be transmitted to data #6~data #13 every bytes. Thus, frame P2 transmitted last is formed.

In communication of data in which a data quantity of data to be transmitted is less and data indicating status, etc. of video deck 20a is transmitted, e.g., from VTR20 to TV10 by one frame, microprocessor 22 of VTR20 forms a frame in which control bits of frame P1 shown in the above-mentioned FIG. 13A is caused to be data communication command, e.g., code "F"h indicating write in non-lock state.

Figure 14:
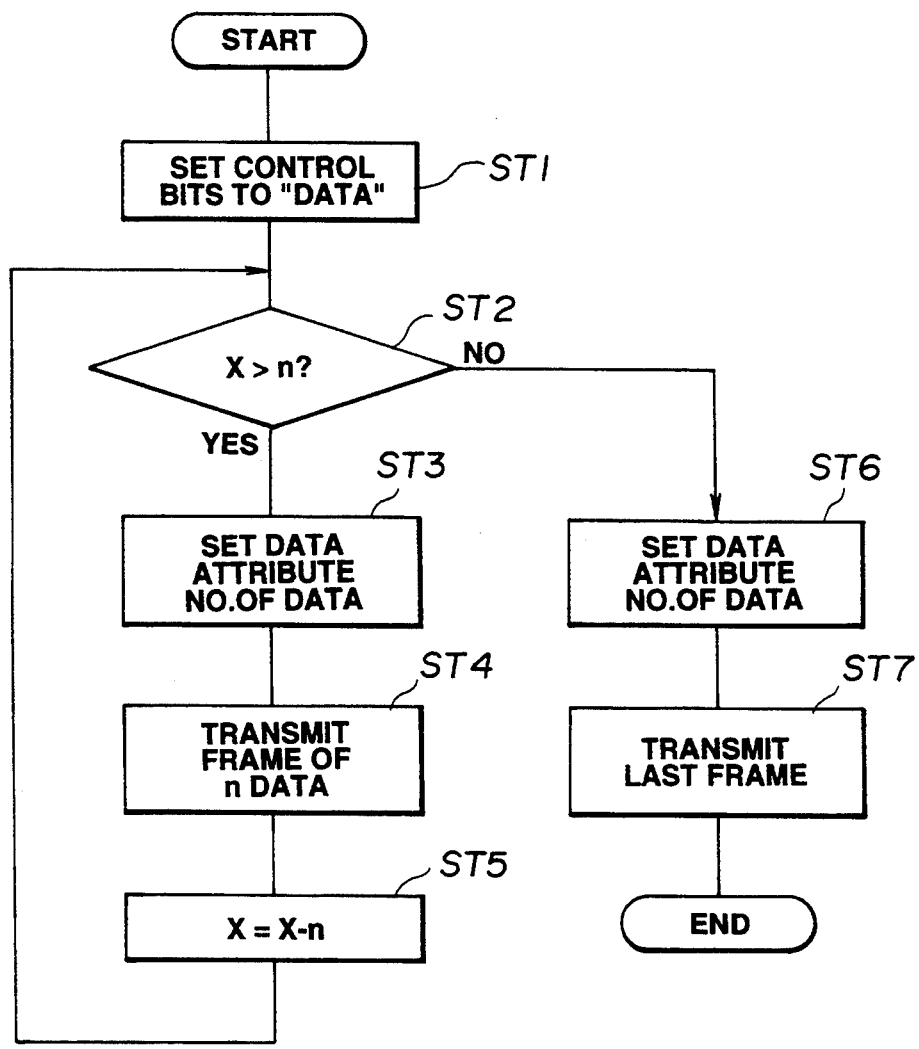
FIG. 14 is a flowchart for explaining the operation for forming a frame.

Namely, when it is assumed that data quantity of data to be transmitted is X and data capacity which can be transmitted by one is n, microprocessor 22 forms a frame in accordance with the flowchart shown in FIG. 14, for example.

At step ST1, microprocessor 22 sets control bits to data communication command. Then, the operation proceeds to step ST2.

At the step ST2, microprocessor 22 judges whether or not the data quantity X is greater than the data capacity n. If so, the operation proceeds to step ST3. If not so, the operation proceeds to step ST6.

At the step ST3, microprocessor 22 assigns DTATR (attribute for discriminating the kind of data) to data #4 and assigns BYTE (data quantity) to data #5, thus to form a frame. Then, the operation proceeds to step ST4.

At the step ST4, microprocessor 22 transmits the frame formed at the step ST3. Then, the operation proceeds to step ST5.

At the step ST5, data capacity n is subtracted from the data quantity X to allows a value obtained by subtraction to be new data quantity X, i.e., calculate the remaining data quantity X. The operation returns to the step ST2.

On the other hand, at step ST6, microprocessor 22 assigns DTATR to data #4 and assigns BYTE to data #5, thus to form a frame. Then, the operation proceeds to step ST7.

At the step ST7, microprocessor 22 transmits the last frame formed at the step ST6. The operation is thus completed.

The frame formed in this way is delivered from microprocessor 12 of TV10 to bus interface circuit 14, or from microprocessor 22 of VTR20 to bus interface circuit 24. These bus interface circuits 14, 24 detect presence or absence of so called carrier on the bi-directional bus 1 to transmit the transmit signal having the above-described frame structure to TV10, VTR20, 30, VDP 40, etc. through bi-directional bus 1 when there is no carrier, i.e., bi-directional bus 1 is empty.

Thus, e.g., microprocessor 22 transmits data from the leading frame, i.e., a frame transmitted first in transmitting data in a manner divided into a plurality of frames, and transmits data also at a frame transmitted last. Further, in transmitting data by one frame, microprocessor 22 transmits data at that frame.

Namely, in the bi-directional bus, a frame for informing a device of destination (on the receiving side) that data are transmitted at the subsequent frames before actual data is transmitted and a frame for informing the device on the receiving side that communication of data is completed at the time point when transmission of data is completed, which were required in the conventional bi-directional bus system, are unnecessary. Accordingly, the traffic quantity can be reduced to much more degree as compared to the conventional system. Thus, the transmission efficiency can be improved. In addition, the communication procedure can be simplified.

Reception of transmit signal having the above-described frame structure will now be described.

For example, in transmission of control command from TV10 to VTR, bus-interface circuit 24 of VTR receives a transmit signal through bi-directional bus 1, and delivers the received transmit signal to microprocessor 22. The microprocessor 22 executes program (software) stored in ROM22a to detect control bits of control field 54 from the transmit signal to detect on the basis of the control bits whether communication carried out is communication of data or communication of control command. Further, microprocessor 22 detects a route select code inserted at a predetermined position of data field 55 from the transmit signal to detect on the basis of the detected route select code whether communication carried out is communication from sub-device included in device to any other device, communication from device to sub-device included in any other device, or communication from device to device.

In actual terms, microprocessor 22 detects, on the basis of master address bits of the master address field 52 and slave address bits of the slave address field 53 of the transmit signal, that this transmit signal is a transmit signal for the microprocessor 22 from, e.g., TV10, and detects, on the basis of control bits of the control field 54, communication of control command (write of control command from master to slave) by, e.g., code "E"h. It is to be noted that microprocessors of VTR30 and VDP40 detect that a current communication is not a communication for VTR or VDP from the fact that the slave address bits do not corresponds to their own addresses, thus not to carry out the operation corresponding to that transmit signal.

Further, microprocessor 22 detects, on the basis of the text header assigned to data #1 of the data field 55, that a current code is not OPC "Begin 2" (code "BD"h), OPC "Begin 1" ("BC"h), or OPC "Begin 0" ("BB"h) used in the conventional D2B by, e.g., code "AB"h, and detects the kind of communications on the basis of HDOPR assigned to data #2, i.e., when, e.g., the lower order 2 bits are 1, 0 (b1=1, b0=0), microprocessor 22 detects that a current communication is communication from device to sub-device; when those bits are b1=0, b0=1, it detects that current communication is communication from sub-device to device, and when those bits are b1=1, b0=1, it detects that current communication is communication from device to device. Namely, even if a transmit signal in conformity with the conventional D2B is transmitted through the same bi-directional bus 1, discrimination therebetween can be made.

At the time of communication from device to sub-device, microprocessor 22 recognizes that DSDA is assigned to data #3. At the time of communication from sub-device to device, microprocessor 22 recognizes that SSDA is assigned to data #3. Further, at the time of communication from device to device, the microprocessor 22 recognizes that data #3 is dummy code "7F"h. In addition, microprocessor 22 specifies, on the basis of DSDA assigned to, e.g., data #3, that a current control is, e.g., control for video deck 20a.

Meanwhile, respective equipments (devices) such as VTR20, etc. have a command Table for converting control commands to internal control commands for controlling sub-devices every sub-devices that those devices include therein, thus to convert (decode) the same control command to internal control command of control contents corresponding to various controlled system sub-devices. In more practical sense, in ROM 22a of the microprocessor 22, for example, a deck/player command Table for video deck 20a, and a tuner command Table for tuner 20b are stored. The microprocessor 22 decodes control commands assigned to data #4, #5 of the data field 55 into internal control commands for controlling the video deck 20a~switch box 20c on the basis of these command Tables to control the video deck 20a~switch box 20c through the internal control bus 21 on the basis of the internal control commands. Namely, e.g., in OPC of the control commands, code "CO"h indicates repeat in the deck/player command, indicates control of band in the tuner command, indicates control of contrast in the video command, and indicates control of volume in the audio command. In other words, a command Table determined by a default value of a sub-device specified by DSDA is used. As a result, code of the same control command can be commonly used so as to cope with various sub-devices. Thus, the control command can be shortened.

For example, when DSDA is video deck 20a, OPC of the control command is code "C3"h, and OPR is code "75"h microprocessor 22 of VTR20 decodes a control command into an internal control command indicating play and forward by using the deck/player command Table to carry out a control so that the video deck 20a conducts a reproducing operation through the internal control bus 21, and to carry out a control so that an AV signal from the video deck 20a is delivered to the switch box 10d of TV10 through switch box 20c. In this way, communication of control command from TV10 (device) to video deck 20a (sub-device) of VTR20 is carried out. Thus, one can view, on TV10, a picture based on the AV signal reproduced by the VTR20.

On the other hand, in transmitting data indicating status of video deck 20a, e.g., from VTR20 to TV10 described above, bus interface circuit 14 of TV10 receives a transmit signal through bi-directional bus 1, and delivers the received transmit signal to microprocessor 12. The microprocessor 12 executes program (software) stored in ROM 12a to detect control bits of the control field 54 from the transmit signal to detect on the detected control bits whether a current communication is communication of data or communication of control command. Further, microprocessor 12 detects a route select code inserted at a predetermined position of data field 55 from the transmit signal to detect on the basis of the detected route select code whether a current communication is communication from a sub-device included in a device to any other device, communication from a device to a sub-device included in any other device, or communication from a device to any other device.

In actual terms, microprocessor 12 detects on the basis of master address bits of the master address field 52 and slave address bits of the slave address field 53 of a transmit signal, that this transmit signal is, e.g., a transmit signal for microprocessor 12 from VTR20, and detects on the basis of control bits of the control field 54 that a current communication is communication of data (writing in lock state or non-lock state of data) when corresponding code is, e g , code "B"h, "F"h. Namely, when data is transmitted in a manner divided into a plurality of frames, microprocessor 12 detects that a current write operation is a write operation in lock state of data from the first frame and write operation in non-lock state of data at the last frame. Further, when data is transmitted in the state of one frame, microprocessor 12 detects that a current write operation is a write operation in non-lock state of data at that frame. When microprocessor 12 receives the first frame of a transmit signal delivered from, e.g., VTR20, it is placed in lock state. When microprocessor 12 receives a transmit signal from, e.g., VDP40, it neglects that received signal (allows that received signal to be invalid), and informs VDP40 that corresponding device is in lock state (locked).

Further, microprocessor 12 detects on the basis of text header assigned to data #1 of data field 55 that a current code is not OPC "Begin 2" (code "BD"h), OPC "Begin 1" ("BC"h), OPC "Begin 0" ("BB"h) used in the conventional D2B by, e.g., code "AB"h and detects, on the basis of HDOPR assigned to data #2, that when the lower order two bits are 1, 0 (b1=1, b0=0), a current communication is communication from device to sub-device, that when those bits are b1=0, b0=1, a current communication is communication from sub-device to device, that when those bits are b1=1,b0=1, a current communication is communication from device to device.

Further, microprocessor 12 recognizes that DSDA is assigned to data #3 when a current communication is communication from device to sub-device, that SSDA is assigned to data #3 when a current communication is communication from sub-device to device, and that data #3 is dummy code "7F"h when a current communication is communication from device to device. Further, microprocessor 12 specifies current data as data from, e.g., video deck 20a on the basis of SSDA assigned to data #3, for example.

Further, microprocessor 12 discriminates the kind of data assigned to data #9~data #16, for example, on the basis of DTATR assigned to data #4. In more practical sense, microprocessor 12 recognizes that when a current code is, e.g., code "20"h, received data is ASCII code, OSD data, that when a current code is, e g., code "21"h received data is Japanese OSD data, and that when a current code is, e g , code "22"h received data is transparent transmit data. In other words, communications of various data can be carried out.

Further, microprocessor 12 detects the number of bytes of data transmitted at this frame on the basis of BYTE assigned to data #5. In more practical sense, microprocessor 12 detects 1 byte~16 bytes respectively in correspondence with codes "20"h~ "2F"h, for example. Namely, microprocessor 12 can recognize in advance data quantity of data of frame, thus making it possible to simplify processing (software) for judging the end of that frame.

Further, microprocessor 12 detects on the basis of OPR1 assigned to data #6 on which line of TV monitor 10b display is carried out. In more practical sense, microprocessor 12 detects the first line, the second line, the third line . . . respectively in correspondence with codes "20"h, "21"h, "22"h . . . .

Further, microprocessor 12 detects the size of a character displayed on TV monitor 10b on the basis of OPR2 assigned to data #7. In more practical sense, microprocessor 12 detects that when a current code is code "20"h, a character displayed is a character of the standard size, and that when a current code is code "21"h, a character displayed is a large letter (character).

Further, microprocessor 12 detects capital or small letter (character) of alphabet on the basis of OPR3 assigned to data #8. In more practical sense, microprocessor 12 detects that when a current code is, e g , code "20"h, a corresponding character is capital, and when a current code is, e.g., code "21"h, a corresponding character is a small letter (character). It is to be noted that when data is divided into a plurality of frames and display condition on screen is not changed, i.e., a character of the same size, etc. is displayed on the same line, these OPR1~ OPR3 are received only at the first frame, and are not received at the subsequent frames.

Further, microprocessor 12 carries out a control to display, under the condition designated by the above-described OPR1~OPR3, characters, etc. based on data assigned to data #9~data #16 on TV monitor 10b. Thus, communication of data indicating status, etc. from video deck 20a (sub-device) of VTR20 to TV10 is carried out. One can view the operating state of, e.g., VTR20 on TV10.

The frame format at the time of transmitting peculiar data (hereinafter referred to as arbitrary data) which is not standardized for different manufacturers will now be described.

Figure 15:
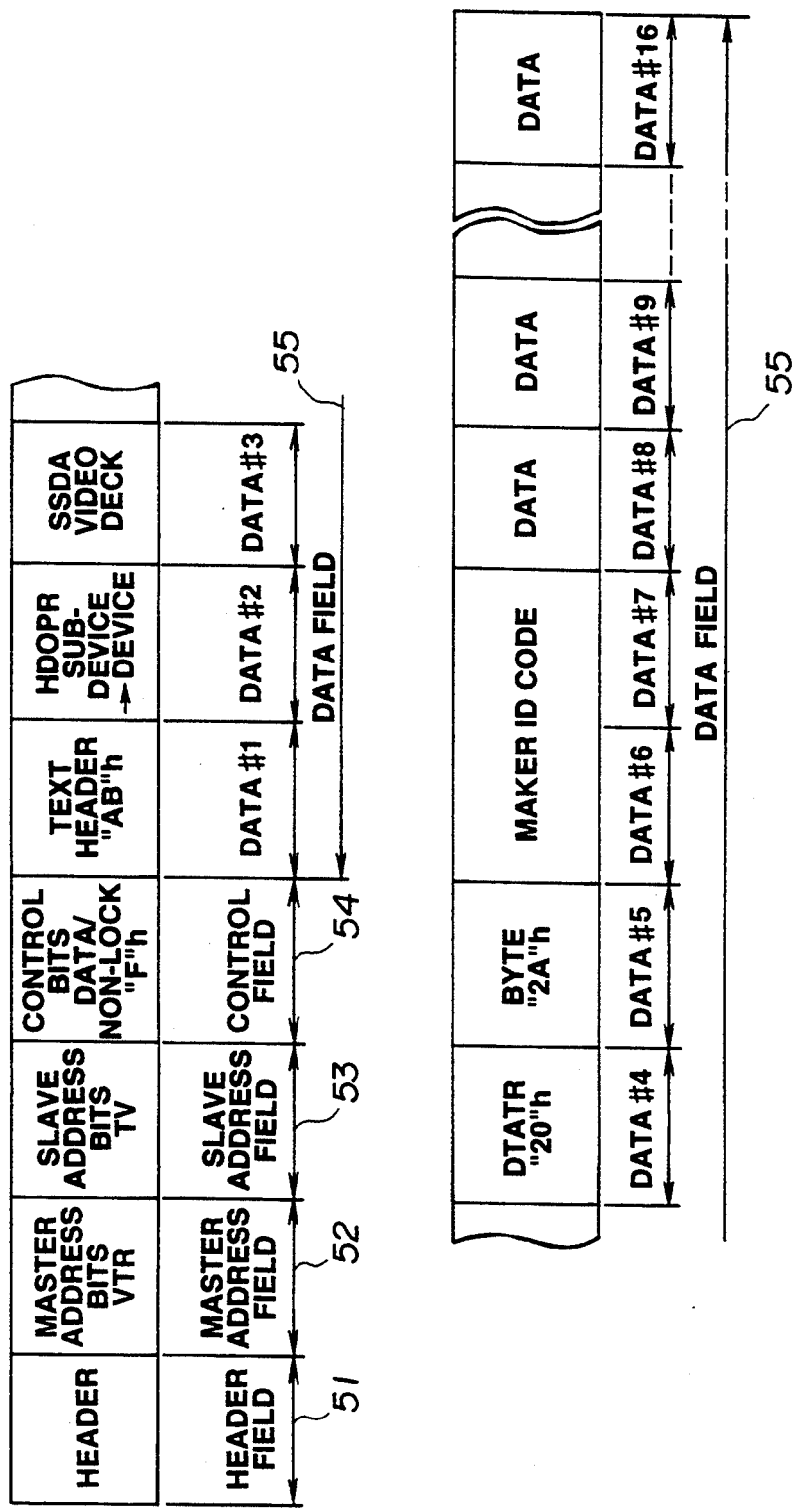
FIG. 15 is a view showing a frame format of a transmit signal for transmitting arbitrary data.

The format of a frame for transmitting arbitrary data is a format in which information relating to manufacturers (makers) i.e., maker identify (ID) code comprised of, e.g., 2 bytes are assigned to data #6, #7 as shown in FIG. 15. Device of the transmitting source specifies maker ID code assigned to the company, which has manufactured that device, to transmit data. Device on the receiving side recognizes on the basis of maker ID code that data of data #7 and data subsequent thereto are, e.g., data peculiar to the company, thus to carry out processing corresponding those data, for example. As a result, it is possible to add any value to device (equipment) of that company, or to exhibit characteristics.

It is to be noted that this invention is not limited to the above-described embodiment, but can be applied to, e.g., a communication to send a request from a device to a sub-device to send an answer from sub-device back to device, e.g., a communication for automatically informing the status of device, or the like. In addition, it is needless to say that this invention can be applied to, e.g., a bi-directional bus system adapted to control AV equipment, e.g., except for D2B or HBS.

As apparent from the foregoing description, in this invention, device of the transmitting source is such that one frame of a transmit signal on bi-directional bus consists of an address field for specifying addresses of devices between which communication is carried out, a control field for specifying data communication command indicating communication of data or communication of control command indicating communication of control command, and a data field for specifying control command or data, and is operative to specify the content of the control field of the leading frame as the data communication command in transmitting data to transmit the transmit signal through bi-directional bus. Device on the receiving side receives the transmit signal through the bi-directional bus to detect on the control field of the leading frame of the received transmit signal whether communication carried out is communication of data or communication of control command, whereby when it is detected that communication carried out is communication of data, it recognizes that the content of the data field of this frame is specified as data to receive data. As a result, a frame for informing device on the receiving side that data is transmitted at subsequent frames before actual data is transmitted and a frame for informing device on the receiving side that communication of data is completed at the time point when transmission of data is completed, which were required in the conventional bi-directional bus system, are unnecessary. Accordingly, the traffic quantity can be reduced to much more degree as compared to the conventional bi-directional bus system. Thus, the transmission efficiency can be improved. In addition, the communication procedure can be simplified.

Further, in this invention, plural kinds of data are prepared. Device of the transmitting source inserts information indicating the kind of data at a predetermined position of the data field to transmit the transmit signal. Device on the receiving side recognizes the kind of received data on the basis of this information, thereby making it possible to carry out communication of various data.

Further, in the communication method according to this invention, device of the transmitting source inserts information indicating data quantity of data transmitted at this frame at a predetermined position of the data field to transmit the transmit signal. Device on the receiving side recognizes data quantity of the received frame on the basis of this information, thereby making it possible to know in advance data quantity of frame. Thus, processing (software) for judging the end of that frame can be simplified.

In addition, device of the transmitting source inserts information relating to manufacturer (maker) at a predetermined position of the data field to transmit the transmit signal. Device on the receiving side recognizes the manufacturer (maker) on the basis of this information, thereby making it possible to carry out communication of peculiar data. Thus, it is possible to, e.g., add any value to device (equipment) of the company which has manufactured that device or to exhibit characteristic.

What is claimed is:

1. A transmitting method for a bi-directional bus system in which a plurality of devices adapted to execute the operation for a received control command and to carry out communication of data are connected to each other through a bi-directional bus used in a home entertainment system, wherein one frame of a transmit signal on said bi-directional bus consists of an address field for specifying addresses of devices between which communication is carried out, a control field for specifying a data communication command indicating communication of data or a control command communication command indicating communication of control commands, and a data field for specifying control commands or data, the transmitting method comprising the steps of:
   specifying, in transmitting data, that the content of the control field of a leading frame includes a data communication command;
   specifying, in transmitting data, that the content of the data field of the leading frame includes both control commands and data; and
   transmitting the transmit signal through said bi-directional bus.

2. A transmitting method as set forth in claim 1, wherein plural kinds of data are prepared, and information indicating the kind of data is inserted at a predetermined position of the data field to transmit the transmit signal.

3. A transmitting method as set forth in claim 1, wherein information indicating a data quantity of data to be transmitted at the frame is inserted at a predetermined position of the data field to transmit the transmit signal.

4. A transmitting method as set forth in claim 1, wherein information relating to a manufacturer is inserted at a predetermined position of the data field to transmit the transmit signal.

5. A transmitting method as set forth in claim 3, wherein information relating to a manufacturer is inserted at a predetermined position of the data field to transmit the transmit signal.

6. A transmitting method as set forth in claim 2, wherein information indicating a data quantity of data to be transmitted at the frame is inserted at a predetermined position of the data field to transmit the transmit signal.

7. A transmitting method as set forth in claim 2, wherein information relating to a manufacturer is inserted at a predetermined position of the data field to transmit the transmit signal.

8. A transmitting method as set forth in claim 6, wherein information relating to a manufacturer is inserted at a predetermined position of the data field to transmit the transmit signal.

9. A receiving method for a bi-directional bus in which a plurality of devices adapted to execute the operation for a received control command and to carry out communication of data are connected to each other through a bi-directional bus used in a home entertainment system,
   wherein a transmit signal is received through said bi-directional bus, said transmit signal having a frame structure consisting of an address field for specifying addresses of devices between which communication is carried out, a control field for specifying a data communication command indicating communication of data or a control command communication command indicating communication of control command, and a data field for specifying a control command or data; and
   detecting on the basis of the control field of the leading frame of the received transmit signal whether a communication carried out is communication of data or communication of control command,
   wherein the receiving method comprises the steps of:
   detecting on the basis of the control field of leading frame of the received transmit signal whether a communication carried out includes communication of data or communication of control command, wherein when it is detected that the communication carried out is the communication of data,
   receiving data on the basis of the recognition that the content of the data field of the leading frame is specified as both the control commands and data.

10. A receiving method as set forth in claim 9, wherein information indicating the kind of data is inserted at a predetermined position of the data field,
   the receiving method comprising:
   recognizing the kind of received data on the basis of said information.

11. A receiving method as set forth in claim 9,
   wherein information indicating a data quantity of the frame is inserted at a predetermined position of the data field,
   the receiving method comprising:
   recognizing a data quantity of the frame received on the basis of said information.

12. A receiving method as set forth in claim 9, wherein information relating to a manufacturer is inserted at a predetermined position of the data field,
   the receiving method comprising
   recognizing the manufacturer on the basis of said information.

13. A receiving method as set forth in claim 11, wherein information relating to a manufacturer is inserted at a predetermined position of the data field,
   the receiving method comprising:
   recognizing the manufacturer on the basis of said information.

14. A receiving method as set forth in claim 10, wherein information indicating a data quantity of the frame is inserted at a predetermined position of the data field, the receiving method comprising:

recognizing a data quantity of the frame received on the basis of said information.

15. A receiving method as set forth in claim 10, wherein information relating to a manufacturer is inserted at a predetermined position of the data field, the receiving method comprising recognizing the manufacturer on the basis of said information.

16. A receiving method as set forth in claim 14, wherein information relating to a manufacturer is inserted at a predetermined position of the data field, the receiving method comprising:

recognizing the manufacturer on the basis of said information.

17. A bi-directional bus system for use with a home entertainment system, said bus system having a plurality of devices adapted to execute the operation for a received control command and to carry out communication of data, each of the plurality of devices comprising:

transmit signal formation means for forming a transmit signal having a frame structure consisting of an address field for specifying addresses of devices between which communication is carried out, a control field for specifying a data communication command indicating communication of data or a control command communication command indicating communication of control command, wherein, in transmitting data, the transmit signal formation means specifies the content of the control field of a leading frame as the data communication command to form the transmit signal and specifies the content of the data field of the leading frame as both control commands and data;

bus output means for outputting the transmit signal formed by the transmit signal formation means to the bi-directional bus;

bus input means adapted to receive the transmit signal through the bi-directional bus; and control means adapted to detect on the basis of the control field of the leading frame of the transmit signal received by the bus input means whether a communication carried out is communication of data or communication of control command, whereby when it is detected that the communication carried out is communication of data, the control means recognizes that the content of the data field of the leading frame is specified as both control command and data to carry out a control to receive data, the plurality of devices being connected to each other through the bi-directional bus.

18. A bi-directional bus system as set forth in claim 17, wherein plural kinds of data are prepared, the transmit signal formation means being operative to insert information indicating the kind of data at a predetermined position of the data field to form the transmit signal, the control means being operative to recognize the kind of received data on the basis of the information.

19. A bi-directional bus system as set forth in claim 17, the transmit signal formation means being operative to insert, at a predetermined position of the data field, information indicating a data quantity of data to be transmitted at the frame to form the transmit signal, the control means being operative to recognize the data quantity of the received frame on the basis of the information.

20. A bi-directional bus system as set forth in claim 17, the transmit signal formation means being operative to insert information relating to a manufacturer at a predetermined position of the data field to form the transmit signal, the control means being operative to recognize the manufacturer on the basis of the information.

21. A bi-directional bus system as set forth in claim 19, the transmit signal formation means being operative to insert information relating to a manufacturer at a predetermined position of the data field to form the transmit signal, the control means being operative to recognize the manufacturer on the basis of the information.

22. A bi-directional bus system as set forth in claim 18, the transmit signal formation means being operative to insert, at a predetermined position of the data field, information indicating a data quantity of data to be transmitted at the frame to form the transmit signal, the control means being operative to recognize the data quantity of the received frame on the basis of the information.

23. A bi-directional bus system as set forth in claim 18, the transmit signal formation means being operative to insert information relating to a manufacturer at a predetermined position of the data field to form the transmit signal, the control means being operative to recognize the manufacturer on the basis of the information.

24. A bi-directional bus system as set forth in claim 22, the transmit signal formation means being operative to insert information relating to a manufacturer at a predetermined position of the data field to form the transmit signal, the control means being operative to recognize the manufacturer on the basis of the information.

* * * * *